(12) United States Patent
Okuno

(10) Patent No.: US 12,175,148 B2
(45) Date of Patent: Dec. 24, 2024

(54) PRINTING DEVICE AND PRINT MANAGEMENT SYSTEM

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/396,863

(22) Filed: Dec. 27, 2023

(65) Prior Publication Data

US 2024/0220172 A1    Jul. 4, 2024

(30) Foreign Application Priority Data

Dec. 28, 2022   (JP) ................ 2022-211771

(51) Int. Cl.
*G06F 3/12*   (2006.01)

(52) U.S. Cl.
CPC ........... *G06F 3/1267* (2013.01); *G06F 3/12* (2013.01); *G06F 3/1204* (2013.01)

(58) Field of Classification Search
None
See application file for complete search history.

(56) References Cited

U.S. PATENT DOCUMENTS 10,171,704 B1 *   1/2019   Li ................. G06K 15/002
2003/0223767 A1 * 12/2003   Park ............. H04N 1/40025
                                           399/66

FOREIGN PATENT DOCUMENTS

JP   2005-100111 A    4/2005
JP   2005-222396 A    8/2005

* cited by examiner

*Primary Examiner* — Darryl V Dottin
(74) *Attorney, Agent, or Firm* — Merchant & Gould P.C.

(57) ABSTRACT

A printing device includes a print engine and a controller. The print engine is configured to perform printing until an allowed printing amount reaches a first threshold value. The allowed printing amount is decreased from an initial value as printing proceeds, while increased in accordance with a particular guaranteed printing amount guaranteed by a printing privilege given to a user. The controller is configured to obtain a print job, detect that the allowed printing amount reaches the first threshold value, interrupt the print job when the allowed printing amount reaches the first threshold value, and determine whether a particular condition is satisfied when the allowed printing amount reaches the first threshold value. When the particular condition is not satisfied, the controller deactivates an unprocessed part of the print job. When the particular condition is satisfied, the unprocessed part of the print job is retained so as to be resumed.

17 Claims, 14 Drawing Sheets

PRINTING DEVICE AND PRINT MANAGEMENT SYSTEM

REFERENCE TO RELATED APPLICATIONS

This application claims priority from Japanese Patent Application No. 2022-211771 filed on Dec. 28, 2022. The entire content of the priority application is incorporated herein by reference.

BACKGROUND ART

The present disclosure relates to a printing device and a print management system.

There is known a service in which users of printing devices pay service providers a fee in accordance with what is printed. In such a service, a prepaid fee system may be introduced. As an example of the prepaid fee system, there is known technology that allows users to purchase a printing privilege for a certain fee and print up to a particular amount of prints guaranteed by the printing privilege.

DESCRIPTION

In the conventional technology described above, when the allowed printing amount, which is calculated based on the guaranteed printing amount guaranteed by the printing privilege and decreased as printing proceeds, reaches a particular value (e.g., zero) during execution of a print job, the printing is stopped, and the print job is canceled.

In such a case (i.e., when the print job has been cancelled as the allowed printing amount has reached zero), if the user purchases another printing privilege, the guaranteed printing amount guaranteed by the printing privilege is added to the allowed print amount, thereby the allowed printing amount being increased and the printing can be resumed. However, in such a case, since the print job has already been cancelled, the user needs to send an unprinted portion of the print job again to the printing device, which is inconvenient for the user.

According to aspects of the present disclosure, there is provided a printing device which is provided with a print engine and a controller including hardware. The print engine is configured to perform printing until an allowed printing amount reaches a first threshold value. The allowed printing amount is to be decreased from an initial value as printing proceeds, and is to be increased in accordance with a particular guaranteed printing amount guaranteed by a printing privilege given to a user by a financial burden borne by the user. The controller is configured to obtain a print job, perform printing in accordance with the print job, detect that the allowed printing amount reaches the first threshold value, interrupt the print job in response to determining that the allowed printing amount reaches the first threshold value, determine whether a particular condition is satisfied in response to the allowed printing amount reaching the first threshold value, in response to determining that the particular condition is not satisfied, deactivate an unprocessed part of the print job, and in response to determining that the particular condition is satisfied, retaining the unprocessed part of the print job is resumable.

According to aspects of the present disclosure, there is provided a print management system which is provide with a terminal device, a print engine configured to print an image on a sheet, and an information management device. The information management device includes a communication interface configured to communicate with each of the printing device and the terminal device via a network, and a controller configured to manage the printing device. The printing device is configured to perform printing until an allowed printing amount reaches a first threshold value. The allowed printing amount being decreased from an initial value as printing proceeds, and is decreased as printing proceeds, the allowed printing amount being increased in accordance with a particular guaranteed printing amount guaranteed by a printing privilege given to a user by a financial burden borne by the user. The print management system is configured such that one of the terminal device, the printing device and the information management device is configured to obtain a print job, detect that the allowed printing amount is decreased to the first threshold value, interrupt the print job in response to determining that the allowed printing amount reaches the first threshold value, determine whether a particular condition is satisfied in response to determining that the allowed printing amount reaches the first threshold value, in response to determining that the particular condition is not satisfied, deactivate an unprocessed part of the print job obtained in the obtaining, and in response to determining that the particular condition is satisfied, retain the unprocessed part of the print job obtained in the obtaining so as to be resumable.

According to the above configurations, when the allowed printing amount has been decreased and reached the first threshold value, if the particular condition is satisfied, the print job is interrupted such that the unprocessed part of the print job is retained so as to be resumed. In this way, the unprocessed part of the print job can be printed to the end when the print job is restarted thereafter. Thus, the configuration improves the convenience for the user.

Figure 8:
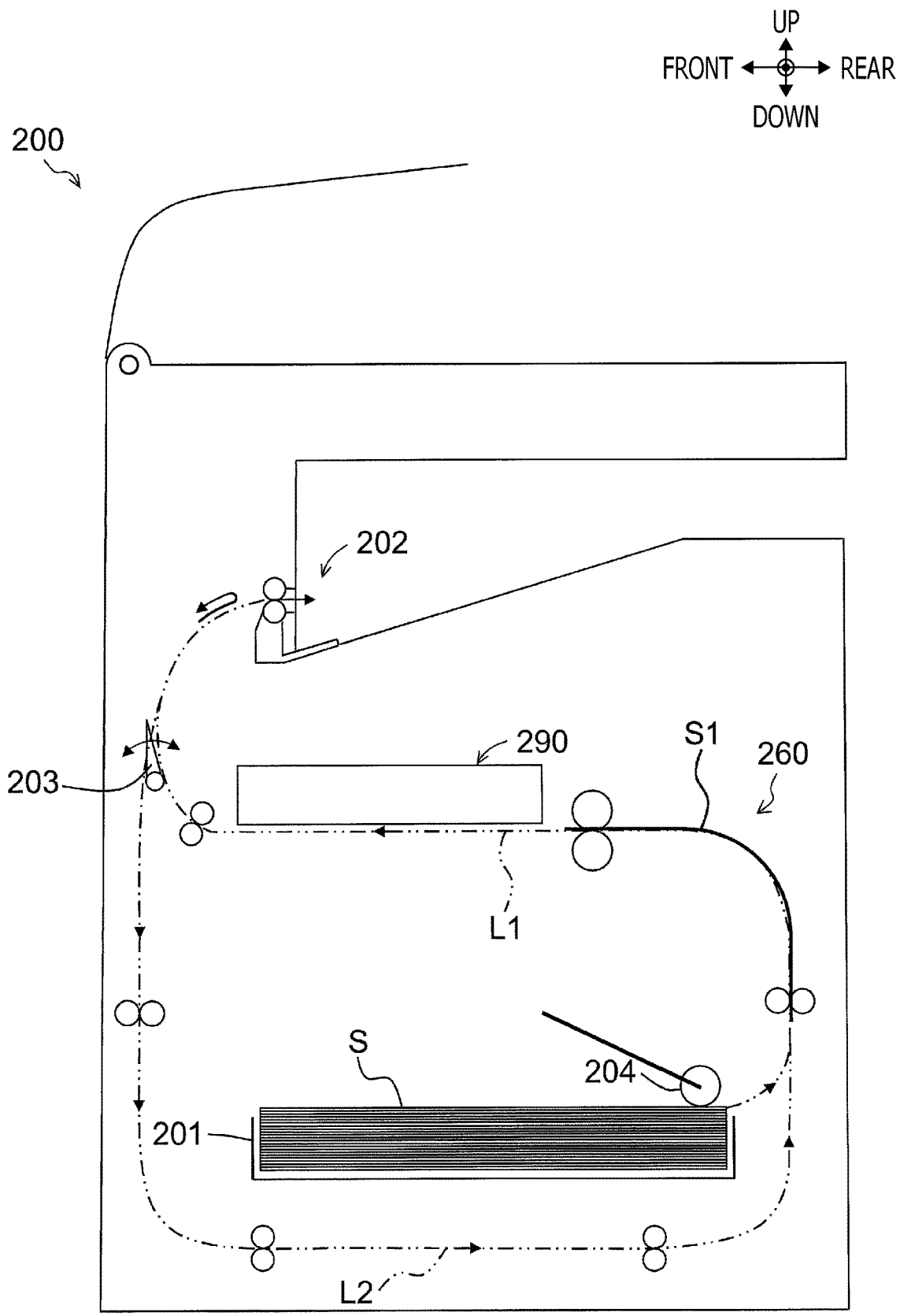

FIG. 8 schematically shows an example of a sheet conveyance passage of the MFP.

Figure 9:
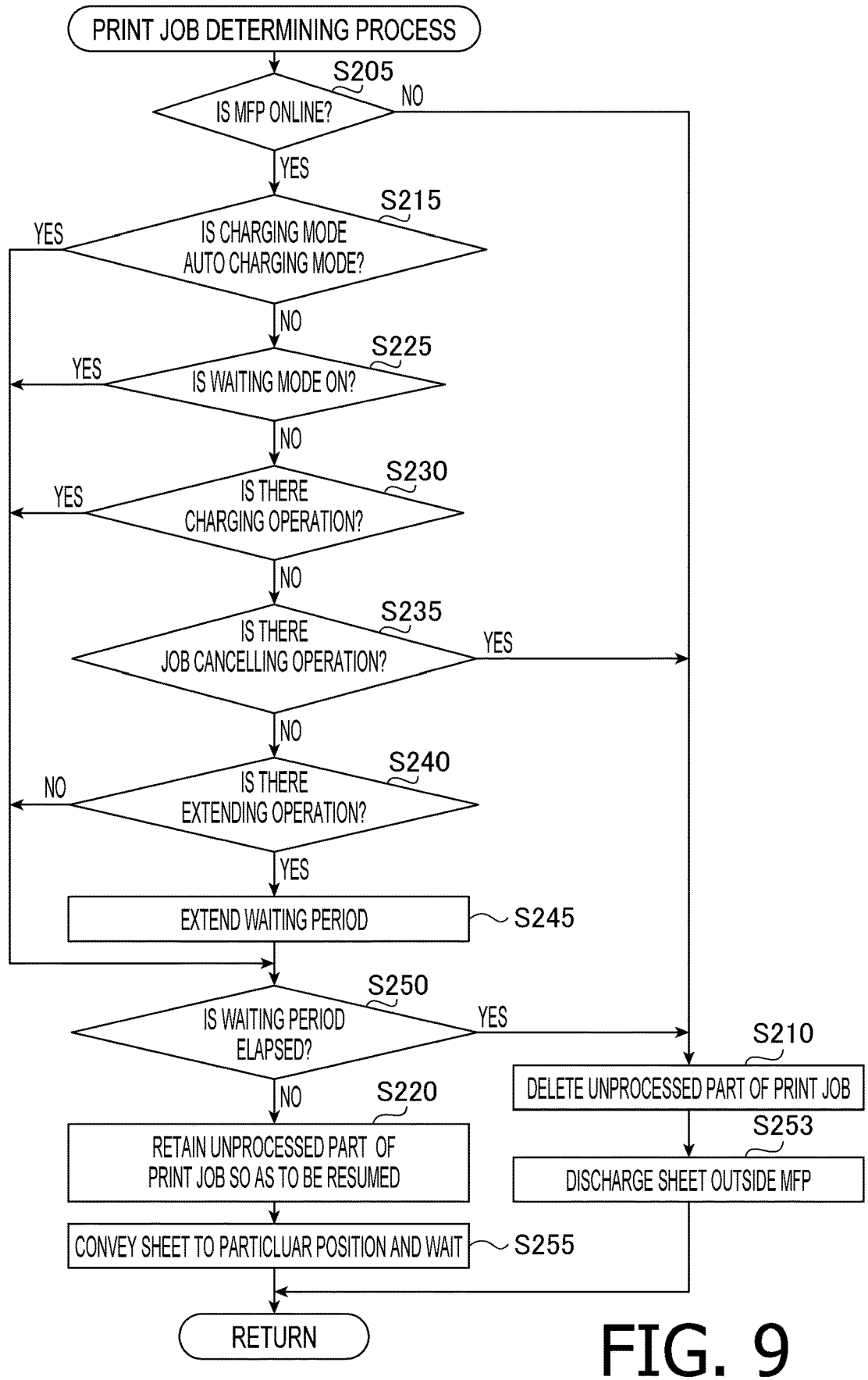

FIG. 9 is a flowchart illustrating an example of a print job determining process executed by the processor of the MFP according to a modified embodiment, in which the sheet is conveyed to a particular position for stand-by.

Figure 10:
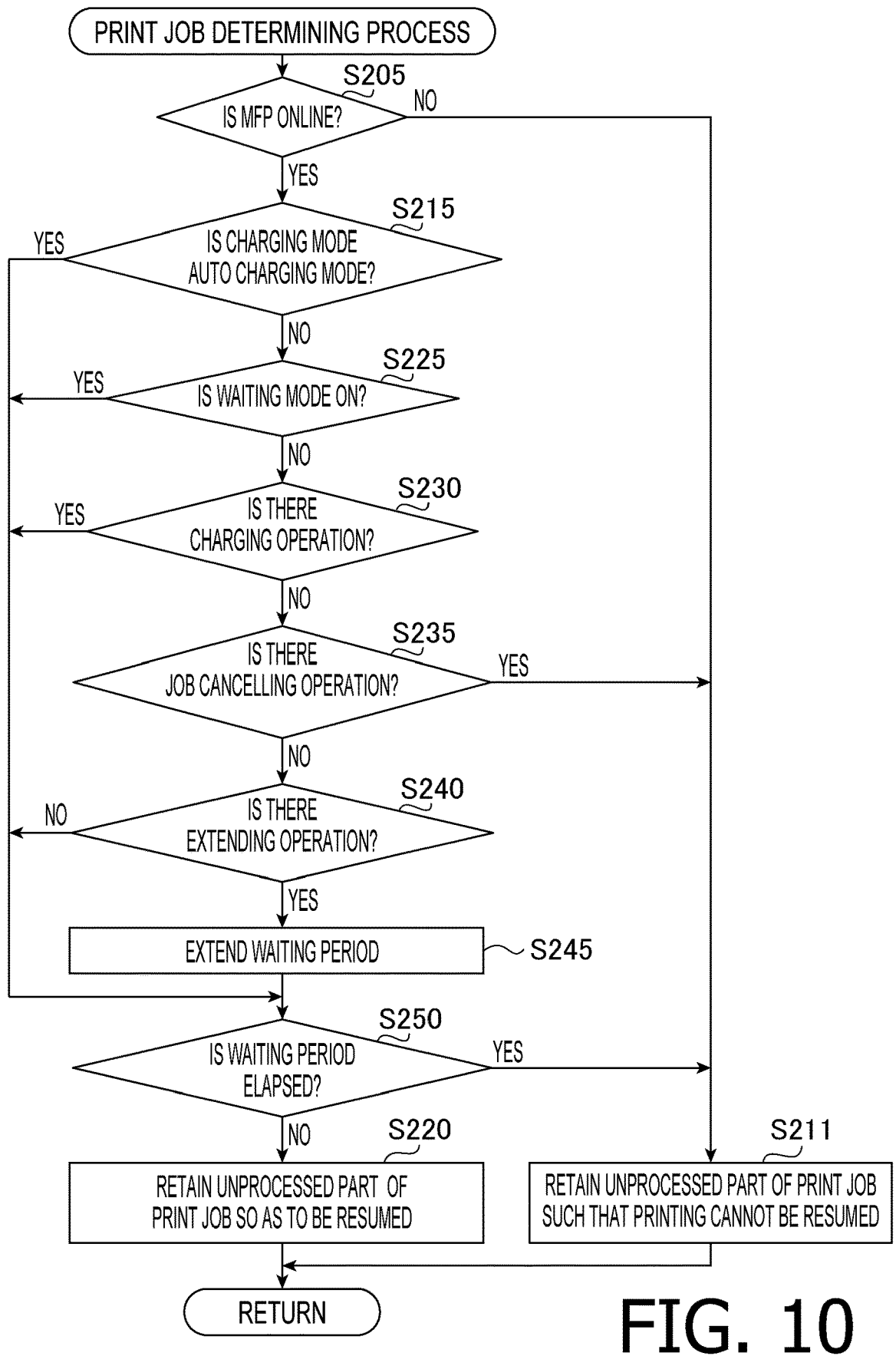

FIG. 10 is a flowchart illustrating an example of the print job determining process executed by the processor of the MFP according to a modified embodiment, in which a print job is suspended and stored.

Figure 11A:
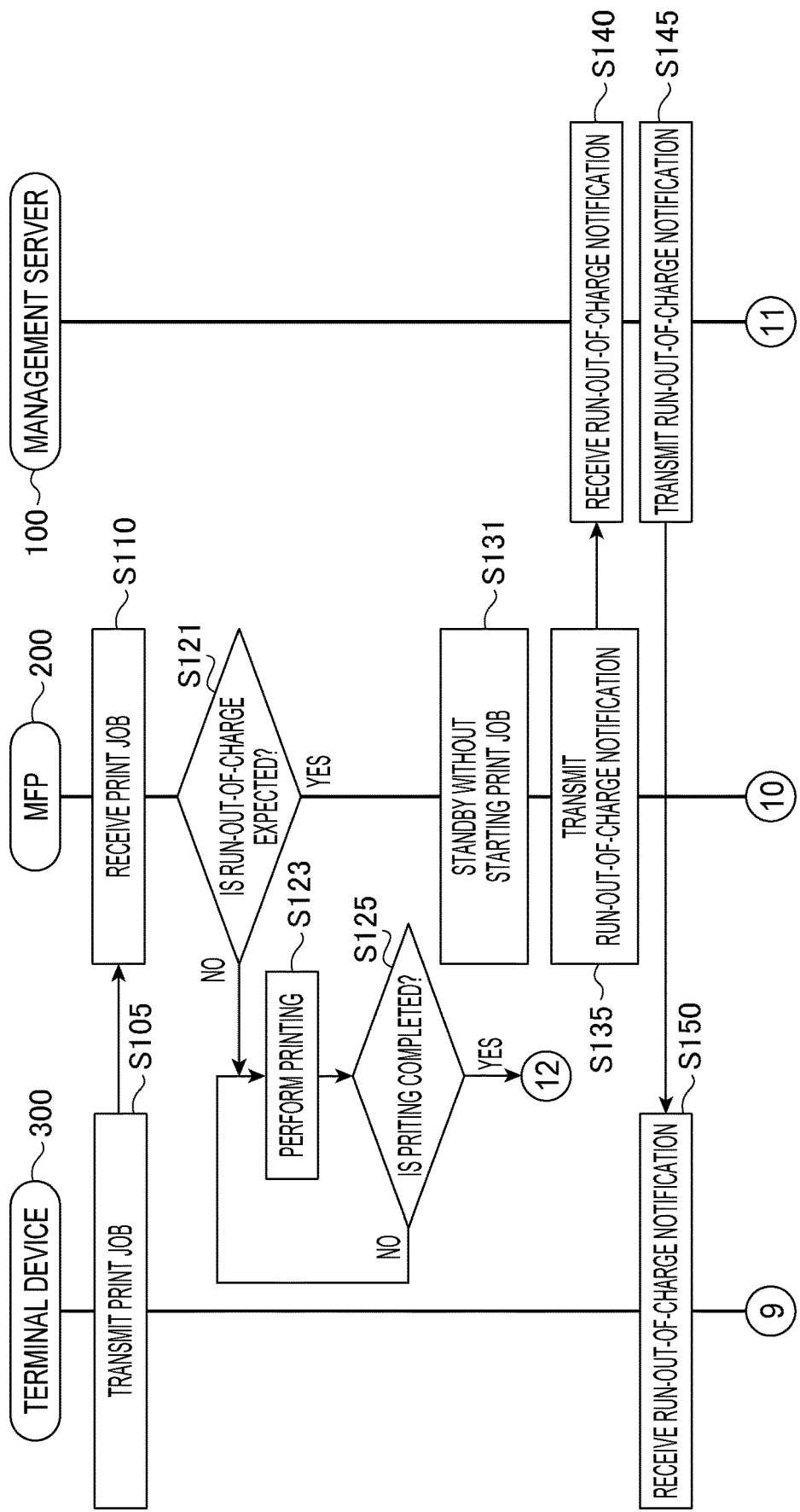
Figure 11B:
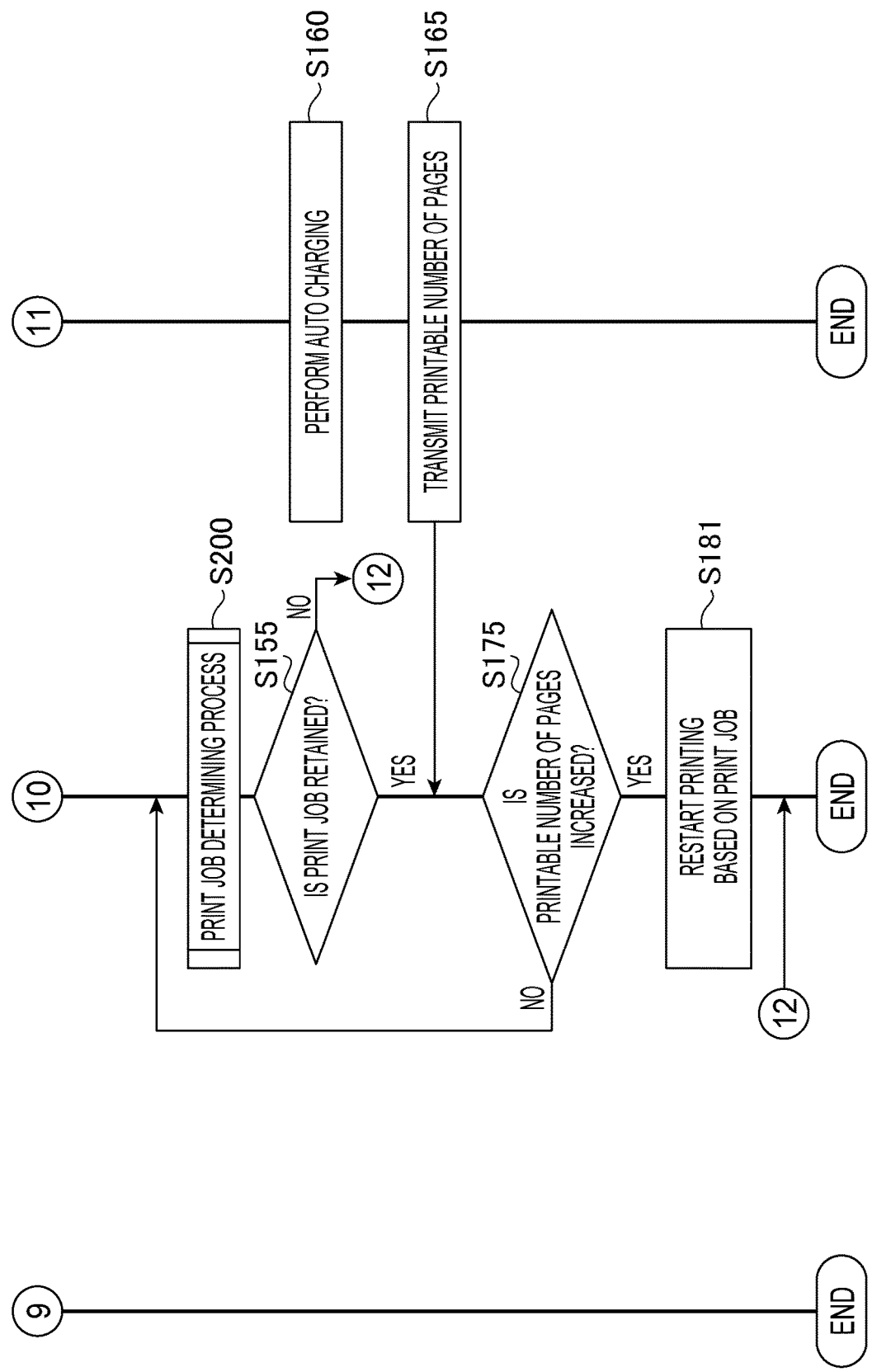

FIGS. 11A and 11B show a sequence chart showing an example of control procedures performed by the processor of the management server, the processor of the MFP and the CPU of the terminal device when the MFP operates in the auto charging mode according to a modified embodiment, in which whether the run-out-of-charge has occurred is determined before starting the printing.

Hereinafter, referring to the accompanying drawings, embodiment and modifications according to aspects of the present disclosure will be described.

Overview of Print Service Providing System

Figure 1:
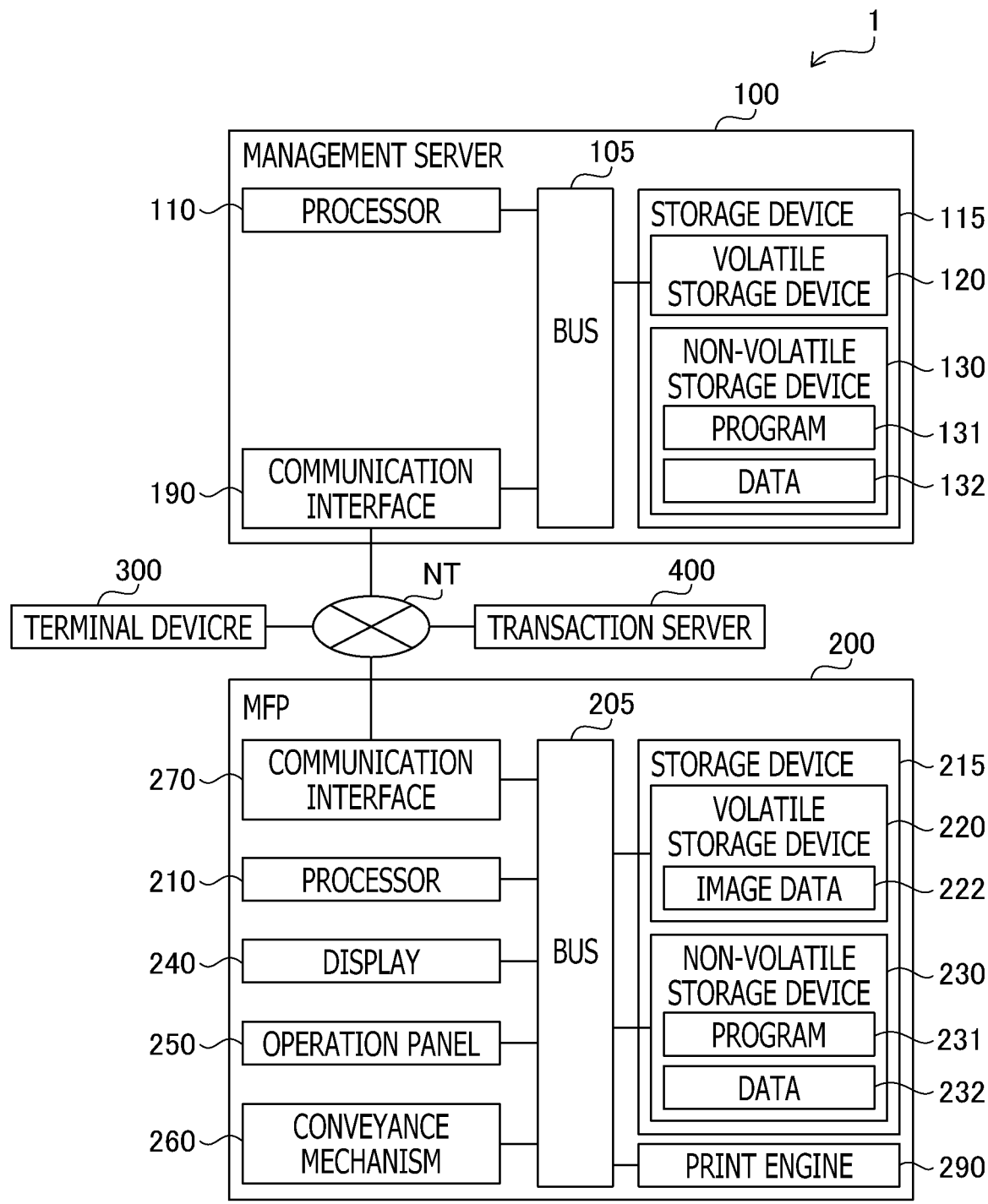
FIG. 1 is a block diagram showing an example of a configuration of a print service providing system.

FIG. 1 shows an example of a configuration of a print service providing system 1 according to an embodiment of the present disclosure. The print service providing system 1 is configured to provide a pre-paid print service in which each user (i.e., each customer) pays a fee in advance and uses a printing function of an MFP (multi-function peripheral) 200. As shown in FIG. 1, the print service providing system 1 includes a management server 100, the MFP 200, a terminal device 300 and a transaction server 400, which are connected to a network NT so as to be mutually communicable with each other. It is noted that the network NT may include a cellular phone communication network.

It is noted that the print service providing system 1 is an example of a print management system, the management server 100 is an example of an information management device, and the MFP 200 is an example of a printing device according to aspects of the present disclosure.

Management Server

The management server 100 is a server that is installed and managed by, for example, a manufacturer of the MFP 200. As shown in FIG. 1, the management server 100 includes a processor 110, a storage device 115, and a communication interface 190, which are connected through a bus 105 so as to transmit/receive data thereamong.

The storage device 115 includes a volatile storage device 120 and a non-volatile storage device 130. The volatile storage device 120 is, for example, a DRAM, which is configured to store various programs and data subjected to be processed. The non-volatile storage device 130 is, for example, a hard disk drive or a solid state drive, and provided with a program storage area 131 and a data storage area 132.

In the program storage area 131, various programs are stored. It is noted that the various programs include programs corresponding to processes based on sequence charts shown in FIGS. 4, 5A, 5B, 6A, 6B, 11A and 11B, which will be described in detail later. In the data storage area 132, various data including, for example, a printable number of pages, a the number of charged pages and the like are stored for each MFP 200 subjected to be managed.

The processor 110 is a device (e.g., a CPU) configured to perform data processing, and is configured to execute programs stored in the program storage area 131. The processor 110 is further configured to perform various processes including a data communication with the terminal device 300, the MFP 200, and the transaction server 400, which are connected to the network NT. The processor 110 is further configured to perform purchasing a print privilege for the print service providing system 1.

It is noted that the processor 110 and the programs stored in the program storage area 131 constitute an example of a controller according to aspects of the present disclosure.

The communication interface 190 is, for example, a wired LAN interface or a wireless LAN interface to communicate with other devices, and is connected to the network NT.

It is noted that the communication interface 190 is an example of a communication I/F (interface) according to aspects of the present disclosure.

It is noted that the storage device 115 is not necessarily limited to devices/elements described above, but may be configured by each of or a combination of a RAM, a ROM, an EEPROM, an HDD, a portable storage medium such as a USB memory detachably attached to the management server 100, and a buffer provided to the processor 110.

The storage device 115 may be a computer-readable storage medium. The computer-readable storage medium is a non-transitory medium. The non-transitory medium includes, besides the above, a storage medium such as a CD-ROM or a DVD-ROM. Further, the non-transitory medium is also a tangible medium. The above applies to a storage device 215 of the MFP 200, which will be described later.

MFP (Multi-Function Peripheral)

The MFP 200 has multiple functions including, for example, a printing function, a scanning function and a copying function. The MFP 200 is owned, for example, by a user who is supposed to receive the pre-paid print service. As shown in FIG. 1, the MFP 200 includes a processor 210, the storage device 215, a display 240, an operation panel 250, a conveyance mechanism 260, a communication interface 270, and a print engine 290, which are connected through a bus 205 so as to transmit/receive data thereamong.

The storage device 215 includes a volatile storage device 220 and a non-volatile storage device 230. The volatile storage device 220 is, for example, a DRAM, and has an image data storage area 222 to store image data subjected to be printed. The non-volatile storage device 230 is, for example, an NVRAM or a flash memory, and has a program storage area 231 and a data storage area 232. The program storage area 231 stores various programs, which include programs corresponding to processes based on sequence charts and or flowcharts shown in FIGS. 4, 5A, 5B, 6A, 6B, 7, 9, 10, 11A and 11B, and firmware such as a print processing program. The data storage area 232 stores a printable number of pages, mode information indicating whether the MFP 200 operates in the auto charging mode or the manual charging mode.

It is noted that the non-volatile storage device 230 is an example of a storage according to aspects of the present disclosure.

The processor 210 is a device configured to perform data processing. The processor 210 is, for example, a CPU. The processor 210 is configured to execute various programs stored in the program storage area 231.

It is noted that the processor 210 and the programs stored in the program storage area 231 constitute an example of a controller according to aspects of the present disclosure.

The display 240 is, for example, an LCD, which is configured to display various pieces of information. The operation panel 250 is a device configured to receive user operations. That is, the user can input various instructions to the MFP 200 by operating the operation panel 250. The communication interface 270 is a wired or wireless network interface to communicate with other devices, and is connected to the network NT.

The conveyance mechanism 260 is configured to convey a sheet S supplied from a tray 201 (see FIG. 8) which is configured to accommodate multiple sheets S. The print engine 290 is disposed on a conveyance passage of the sheet S conveyed by the conveyance mechanism 260, and is configured to form an image corresponding to a print job onto the sheet S conveyed by the conveyance mechanism 260. A printing method is not necessarily limited to a particular one, and may be, for example, an inkjet printing method or a laser printing method. The print engine 290 is configured to perform printing onto the sheet S in accordance with a print job transmitted from the terminal device 300 or a print job generated by the print engine itself based on the user operation of the operation panel 250.

It is noted that the sheet S is an example of a recording medium according to aspects of the present disclosure.

Terminal Device

Figure 2:
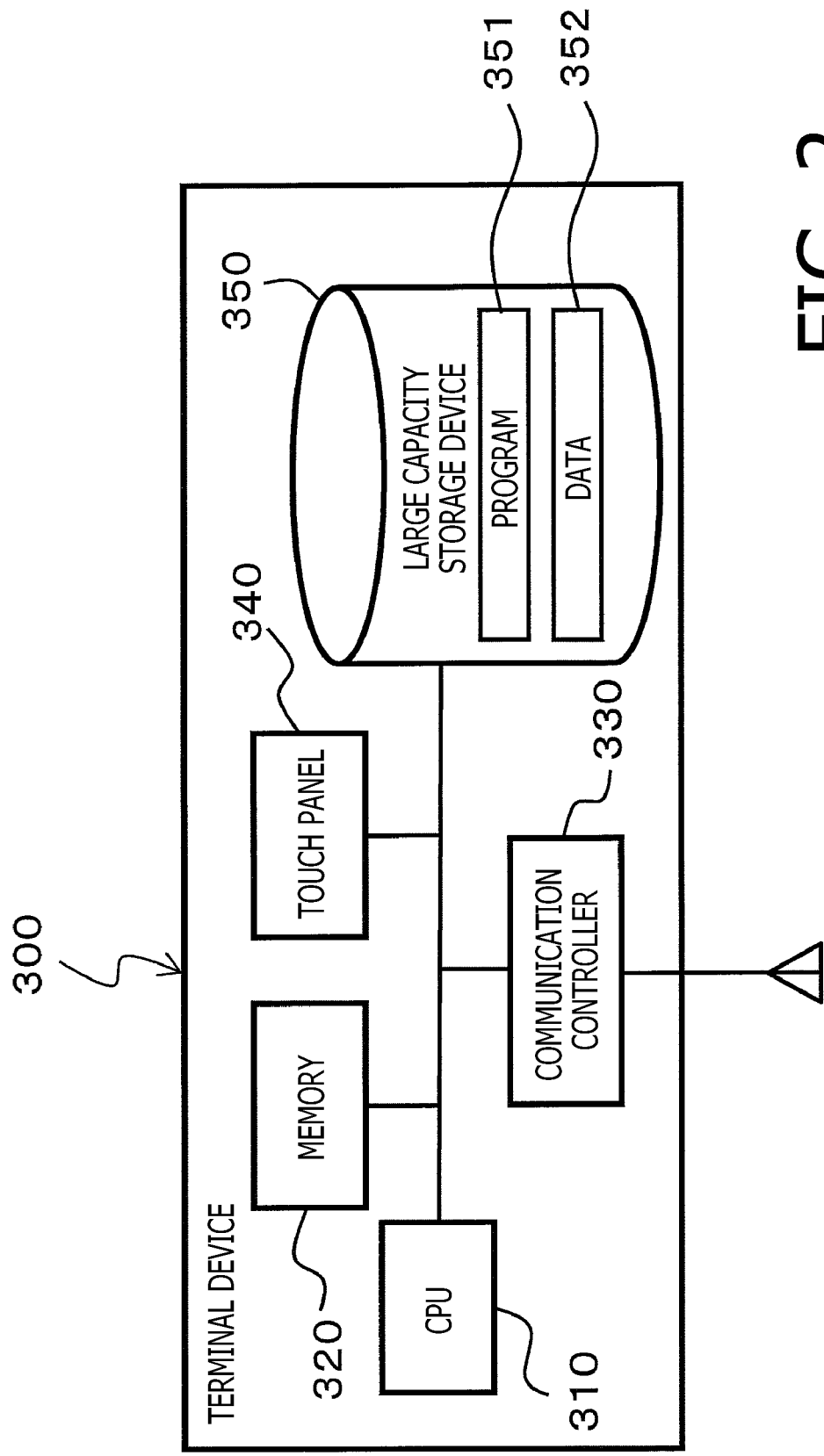
FIG. 2 is a block diagram showing an example of a configuration of a terminal device.

FIG. 2 shows an example of a configuration of the terminal device 300. The terminal device 300 is, for example, a portable terminal device such as a smartphone owned by the user, and is connected to the network NT through a wireless communication. As shown in FIG. 2, the terminal device 300 includes a CPU 310, a memory 320, a communication controller 330 to connect to the network NT via the wireless communication, a touch panel 340, and a large capacity storage device 350.

The large capacity storage device 350 is, for example, a flash memory, which is provided with a program storage area 351 and a data storage area 352. In the program storage area 351, various programs are stored, for example, as firmware. The CPU 310 is configured execute the various programs stored in the program storage area 351. The CPU 310 is configured to perform various processes including a data communication with the management server 100 connected to the network NT.

With use of the touch panel 340 which is configured by integrally combining the LCD with a touch pad, the terminal device 300 displays various pieces of information, and receive various user operations. It is noted that the user can input various instructions to the terminal device 300 by operating the touch panel 340.

As the terminal device 300, other information terminal devices such as a tablet computer, a note PC, a desktop PC or the like may be used instead of the portable terminal device.

Transaction Server

As shown in FIG. 1, the transaction server 400 is connected to the network NT. The transaction server 400 is a sever configured to perform online payment via the network NT. The transaction server 400 is provided with a processor, a storage device, and a communication interface for connecting to the network NT. Since a configuration of the transaction server 400 is of the well-known type, details thereof will be omitted.

Pre-Paid Print Service

Figure 3:
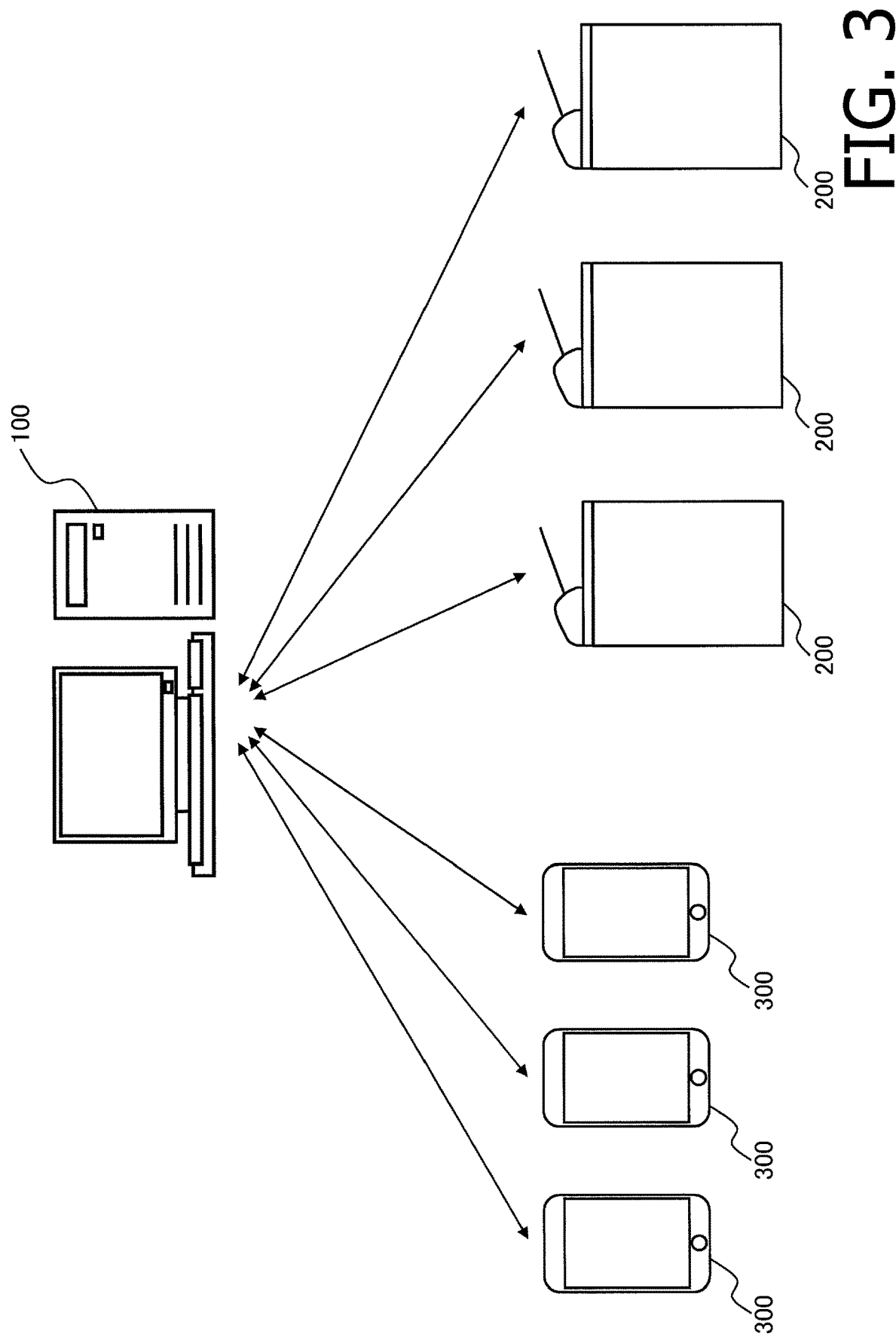
FIG. 3 shows an example of an information transmission/reception configuration employed in the print service providing system.

In the print service providing system 1 according to the present embodiment, each of the management server 100, the MFP 200, the terminal device 300 and the transaction server 400 is configured to transmit/receive information through the network NT. Information is transmitted/received such that, as shown in FIG. 3, multiple terminal devices 300 respectively owned by multiple users and multiple MFPs 200 installed at various locations are configured to transmit/receive information to/from the management server 100 individually. The management server 100 is configured to centrally manage events which are performed from the multiple terminal devices 300 and are directed to the multiple MFPs 200, respectively. It is noted that an "event" according to the present embodiment is purchasing or obtaining of printing privilege for a designated MFP 200, execution of printing, and the like. The management server 100 executes the events in accordance with an instruction from the terminal device 300, and/or automatically when a particular condition is satisfied.

In the present embodiment, a print service provided by the print service providing system 1 is the pre-paid print service. The pre-paid print service is a service in which a particular number of charged pages guaranteed by the printing privilege obtained by the user's financial burden is added to the printable number of pages of the target MFP 200, and the printing process on the relevant MFP 200 can be executed based on the updated printable number of pages. The addition of the number of charged pages to the printable number of pages is performed, for example, by the processor 110 and transmitted to the MFP 200, for example, at regular intervals. The printable number of pages is stored, for example, in the data storage area 232 of the non-volatile storage device 230 of the MFP 200, and is decreased by the number of printed pages each time printing is performed. The decreasing of the printable number of pages is performed, for example, by the processor 210 and transmitted to the management server 100 for, example at, regular intervals. It is noted that, in the following description, purchasing of a certain printing privilege to obtain a certain number of pages to be charged (i.e., to be added to the printable number of pages) will also be simply referred to as purchasing of a certain number of pages, for the sake of description.

It is noted that the number of charged pages is an example of a guaranteed print amount, and the printable number of pages is an example of an allowed printing amount.

In the print service providing system 1 according to the present embodiment, as one of purchasing types of the printing privilege, purchasing the printing privilege based on a purchasing request in accordance with a user's manual operation is available. The purchasing of the printing privilege based on the user's purchasing request is performed such that a purchasing request of the printing privilege is transmitted from the terminal device 300 to the management server 100 based on the user's operation on the terminal device 300, and the thus transmitted request is received by the management server 100. The purchasing of the printing privilege based on the user's operation can be performed at any timing desired by the user. For example, the user may select one of several charge plans that differ from each other in price and unit of purchase (e.g., 500 yen for 50 pages, 900 yen for 100 pages, 2000 yen for 250 pages, and the like).

The user obtains the printing privilege corresponding to the charge plan the user selected such that the obtained printing privilege is associated with a printer ID of the MFP 200 designated by the user. As a result, the number of charged pages guaranteed by the obtained printing privilege is added to the printable number of pages for the MFP 200. It is noted that the printing privilege may be obtained in association with a user ID of the user, and the number of charged pages guaranteed by the printing privilege may be added to the printable number of pages associated with the user ID. In the following description, the purchasing of the printing privilege based on the purchasing request in accordance with the manual operation by the user will be referred to as a "manual charging" as appropriate.

If the user needs to purchase the additional printing privilege by the manual charging every time the printable number of pages of the corresponding MFP 200 becomes low, the user operation would be a time-consuming and burdensome process for the user.

In the print service providing system 1 according to the present embodiment, as another purchasing type different from the manual charging described above, an automatic purchasing of the printing privilege that is not based on a purchase request by the user's manual operation is also available. According to the automatic purchasing, the number of charged pages guaranteed by the automatically purchased printing privilege is added to the printable number of pages of the corresponding MFP 200. The automatic purchasing of the printing privilege, which is not based on the user's manual purchasing request, will be hereinafter referred to as an "auto charging" as appropriate.

In a state where the pre-paid printing service is being provided to the user, when the management server 100 determines that a particular threshold condition has been satisfied, the auto charging is executed by the management server 100. That is, the timing at which the auto charging is executed is a timing at which the particular threshold condition is satisfied. According to the present embodiment, an example of the particular threshold condition is a condition in which the printable number of pages of the target MFP 200 becomes less than or equal to a certain threshold value, and the auto charging is performed at that timing. It is noted that, the "certain threshold" can be changed arbitrarily by the user according to the present embodiment.

Manual Charging Mode and Auto Charging Mode

The MFP 200 is configured such that its charging mode can be switched between the manual charging mode and the auto charging mode. The manual charging mode is a mode in which the number of charged pages corresponding to the printing privilege based on the purchasing request according to the manual operation of the user is added to the printable number of pages. The auto charging mode is a mode in which the number of charged pages corresponding to the printing privilege automatically purchased not based on a purchasing request according to a manual operation of the user is added to the printable number of pages.

It is noted that the manual charging mode is an example of a first mode, the printing privilege based on the purchasing request according to the manual operation is an example of a first printing privilege, and the number of charged pages set in the manual charging mode is an example of a first guaranteed printing amount according to aspects of the present disclosure. Further, the auto charging mode is an example of a second mode, the printing privilege automatically purchased is an example of a second printing privilege, and the number of charged pages set in the auto charging mode is an example of a second guaranteed printing amount according to aspects of the present disclosure.

The charging mode of the MFP 200 is set, for example, to the manual charging mode in its initial setting, and the charging mode can be switched to the auto charging mode in accordance with a request by the user. When the charging mode is switched to the auto charging mode, mode information representing that the current charging mode of the MFP 200 is the auto charging mode is stored in the data storage area 232 of the storage device 215 of the MFP 200. It is further noted that the charging mode of the MFP 200 can be returned from the auto charging mode to the manual charging mode in accordance with the request by the user. When the charging mode of the MFP 200 is switched from the auto charging mode to the manual charging mode, the mode information indicating that the charging mode is the auto charging mode, which is stored in the data storage area 232, is deleted, and the mode information indicating that the charging mode is the manual charging mode is stored in the data storage area 232. If, thereafter, the charging mode is further changed to the auto charging mode, the mode information representing the manual charging mode is deleted and the mode information representing the auto charging mode is stored in the data storage area 232.

Figure 4:
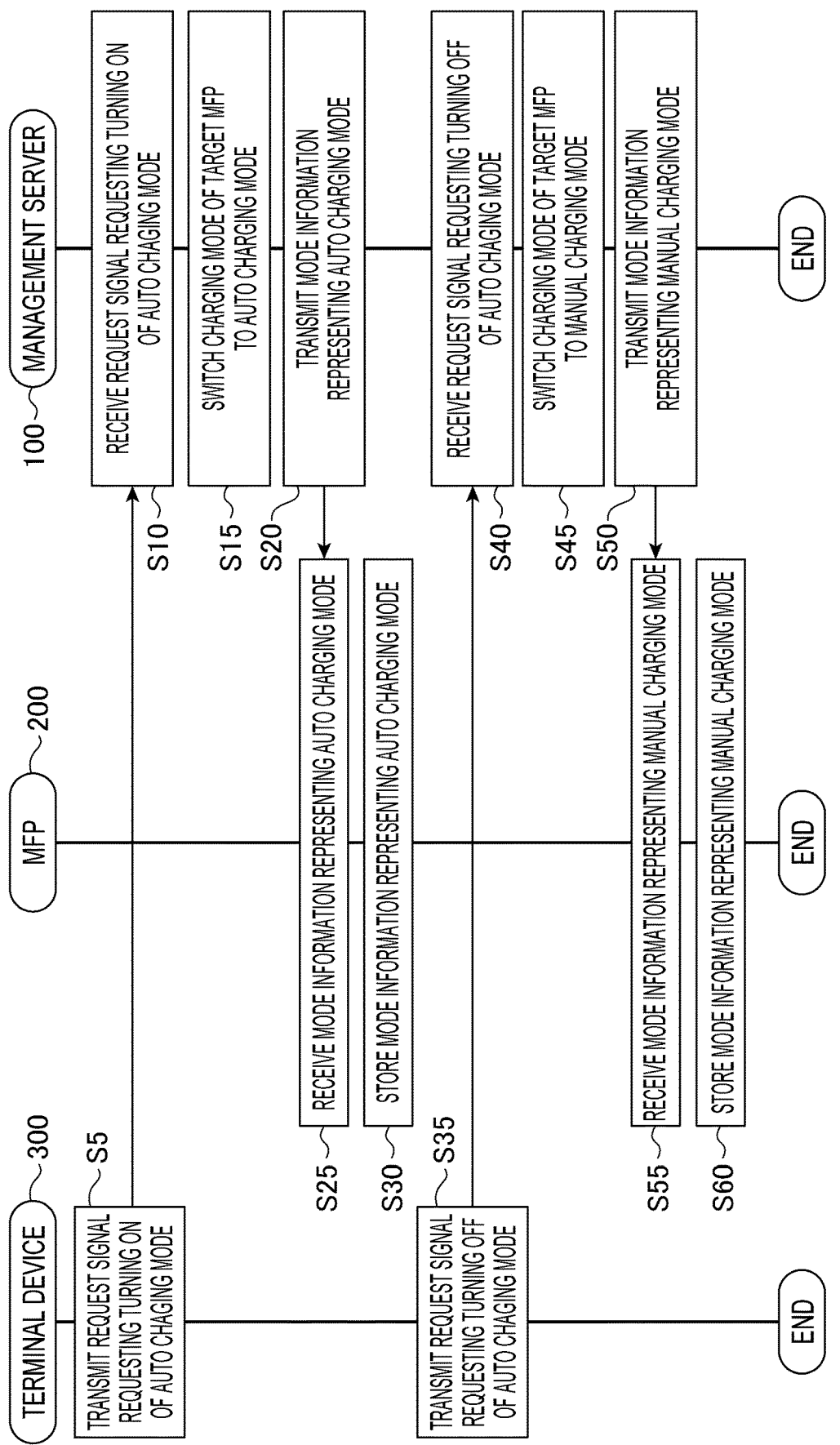
FIG. 4 is a sequence chart showing an example of control procedures performed by a processor of a management server, a processor of an MFP (multi-function peripheral) and a CPU of the terminal device when a charge mode of the MFP is switched between an auto charging mode and a manual charging mode.

FIG. 4 is a sequence chart illustrating an example of control procedures executed by the processor 110 of the management server 100, the processor 210 of the MFP 200 and the CPU 310 of the terminal device 300 when the charging mode is switched between the auto charging mode and the manual charging mode.

As shown in FIG. 4, when the user performs a particular operation, on the terminal device 300, to set the charging mode of the MFP 200 to the auto charging mode (i.e., to set the auto charging mode to ON), the CPU 310 of the terminal device 300 transmits (S5) a request signal to set the auto charging mode to ON in accordance with the particular operation by the user to the management server 100. The request signal contains information associated with ID information or information associated with the ID information of the MFP 200 that is the target of the request.

In S10, the processor 110 of the management server 100 receives the request signal, which is transmitted form the terminal device 300 and requests to set the auto charging mode to ON.

In response to the request signal to set the auto charging mode to ON, the processor 110 changes setting information regarding the target MFP 200 from information indicating the manual charging mode to information indicating the auto charging mode. It is noted that the setting information is information indicating the charging mode currently set to the target MFP 200 and is stored in the data storage area 132 of the management server 100.

In S20, the processor 110 transmits the mode information representing the auto charging mode to the MFP 200. The mode information may be, for example, a judgement flag enabling the processor 210 to determine that the charging mode is the auto charging mode.

In S25, the processor 210 receives the mode information transmitted from the management server 100. It is noted that, since the mode information transmitted in S20 represents the auto charging mode, the MFP 200 receives the mode information representing the auto charging mode in S25.

In S30, in response to receipt of the mode information representing the auto charging mode in S25, the processor 210 stores the received mode information, for example, in the data storage area 232 of the storage device 215. If the mode information representing the manual charging mode is stored in the storage area 232, the processor 210 deletes the mode information representing the manual charging mode from the data storage area 232. It is noted that S25 and S30 are examples of a process of storing mode information according to aspects of the present disclosure.

When the user performs a particular operation, on the terminal device 300, to set the auto charging mode to OFF, the CPU 310 transmits a request signal to set the auto charging mode to OFF to the management server 100. The request signal contains the ID information or information associated with the ID information of the MFP 200 that is the target of the request.

In 540, the processor 110 of the management server 100 receives the request signal transmitted from the terminal device 300 and requesting to set the auto charging mode to OFF.

According to the present embodiment, when the auto charging mode is turned OFF, the manual charging mode is turned ON. Therefore, in response to the request signal to set the auto charging mode to OFF, the processor 110 changes the setting information regarding the target MFP 200 from information indicating the auto charging mode to information indicating the manual charging mode.

In S50, the processor 110 transmits the mode information representing the manual charging mode to the target MFP 200. The mode information may be, for example, a judgement flag enabling the processor 210 to determine that the charging mode is the manual charging mode.

In S55, the processor 210 receives the mode information transmitted from the management server 100. It is noted that the mode information is an example of a reset signal according to aspects of the present disclosure. It is noted that, since the mode information transmitted in S50 represents the manual charging mode, the MFP 200 receives the mode information representing the manual charging mode in S25.

In S60, in response to receipt of the mode information representing the manual charging mode in S55, the processor 210 stores the mode information representing the manual charging mode in, for example, the data storage area 232 of the storage device 215. At this time, the processor 210 deletes the mode information representing the auto charging mode from the data storage area 232.

In this regard, it is noted that S60 is an example of a process of deleting a mode (i.e., a process of deleting the mode information representing the auto charging mode) according to aspects of the present disclosure.

Features of Embodiment

In the print service providing system 1 configured as above, when the printable number of pages becomes insufficient to complete the currently performed print job during the execution of the same on the MFP 200, the printing is interrupted. In such a case, if the print job is merely interrupted, the user can restart the printing by newly purchasing a further number of charged pages to increase the printable number of pages. However, if the print job is cancelled when the printing is stopped, it becomes necessary for the user to transmit the print job again to the MFP 200, which is inconvenient. Further, if the user transmits the print job without accurately knowing a portion which has already been printed or which has not been printed, there would be a duplication of pages if the pages of the print job having been printed are reprinted and the sheets S are wasteful consumed, or there would be missing pages which should have been printed but not.

According to the present embodiment, when the printable number of pages becomes insufficient during the execution of a print job, if the particular condition is satisfied, the printing is stopped with an unprocessed part of the print job is retained (i.e., the print job is not deleted) to enable resumption of printing. In this way, when the user newly purchases the number of charged pages to increase the printable number of pages, it becomes possible to resume the printing (i.e., continue the printing of unprocessed portion of the print job) and complete the print job to the end, which improves the convenience for the user. Further, the printing is resumed without the duplication of pages, or without the missing pages. The particular condition could be any condition, and may be conditions related to printing using the print engine 290.

Controlling Processes

Hereinafter, examples of processes of controlling performed by the processor 110, the processor 210 and the CPU 310 will be described referring to sequence charts shown in FIGS. 5A, 5B, 6A and 6B, and a flowchart shown in FIG. 7.

Figure 5A:
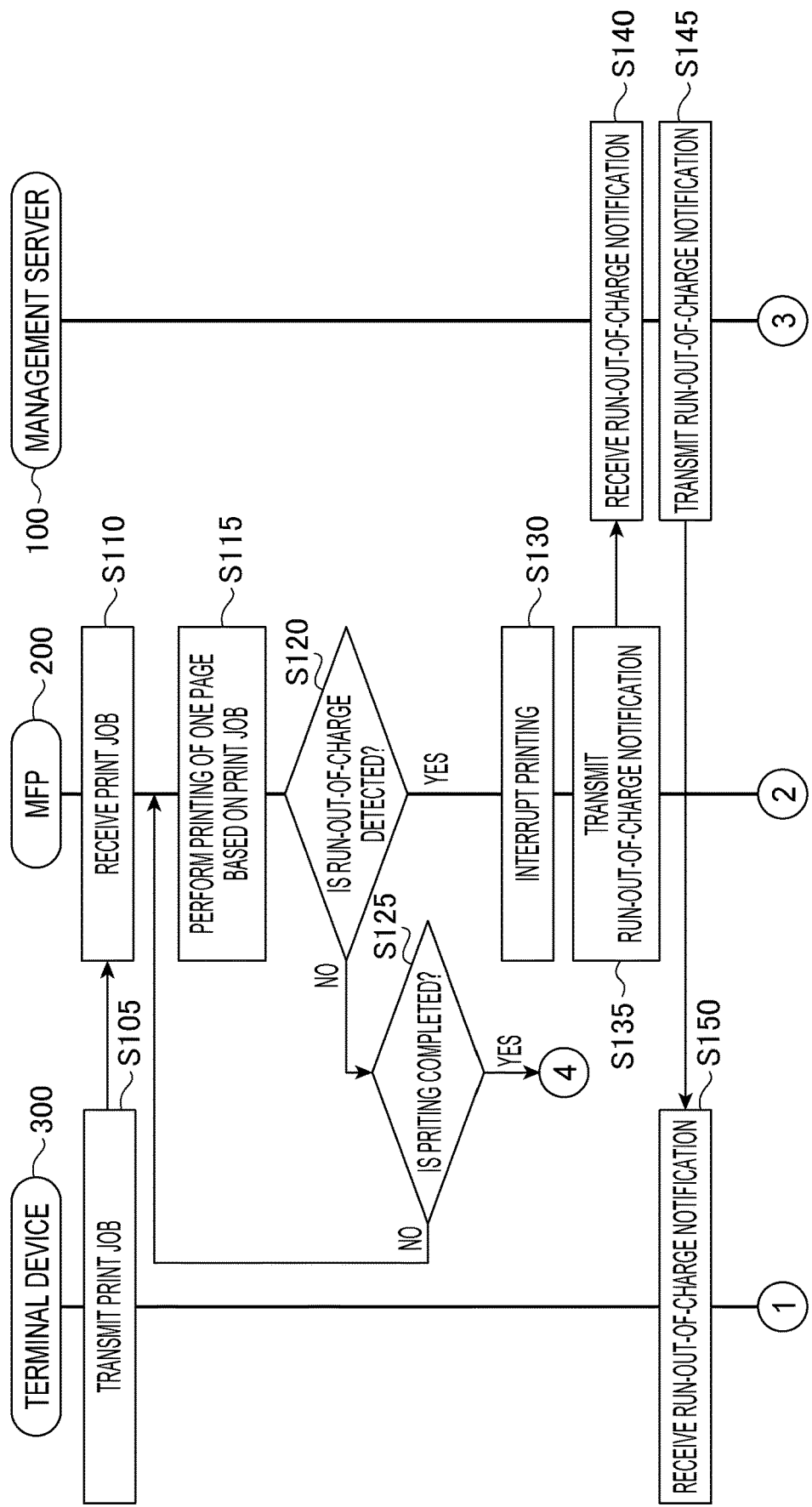
FIGS. 5A and 5B shows a sequence chart showing an example of control procedures performed by the processor of the management server, the processor of the MFP and the CPU of the terminal device when run-out-of-charge has occurred when the MFP operates in the auto charging mode.
Figure 5B:
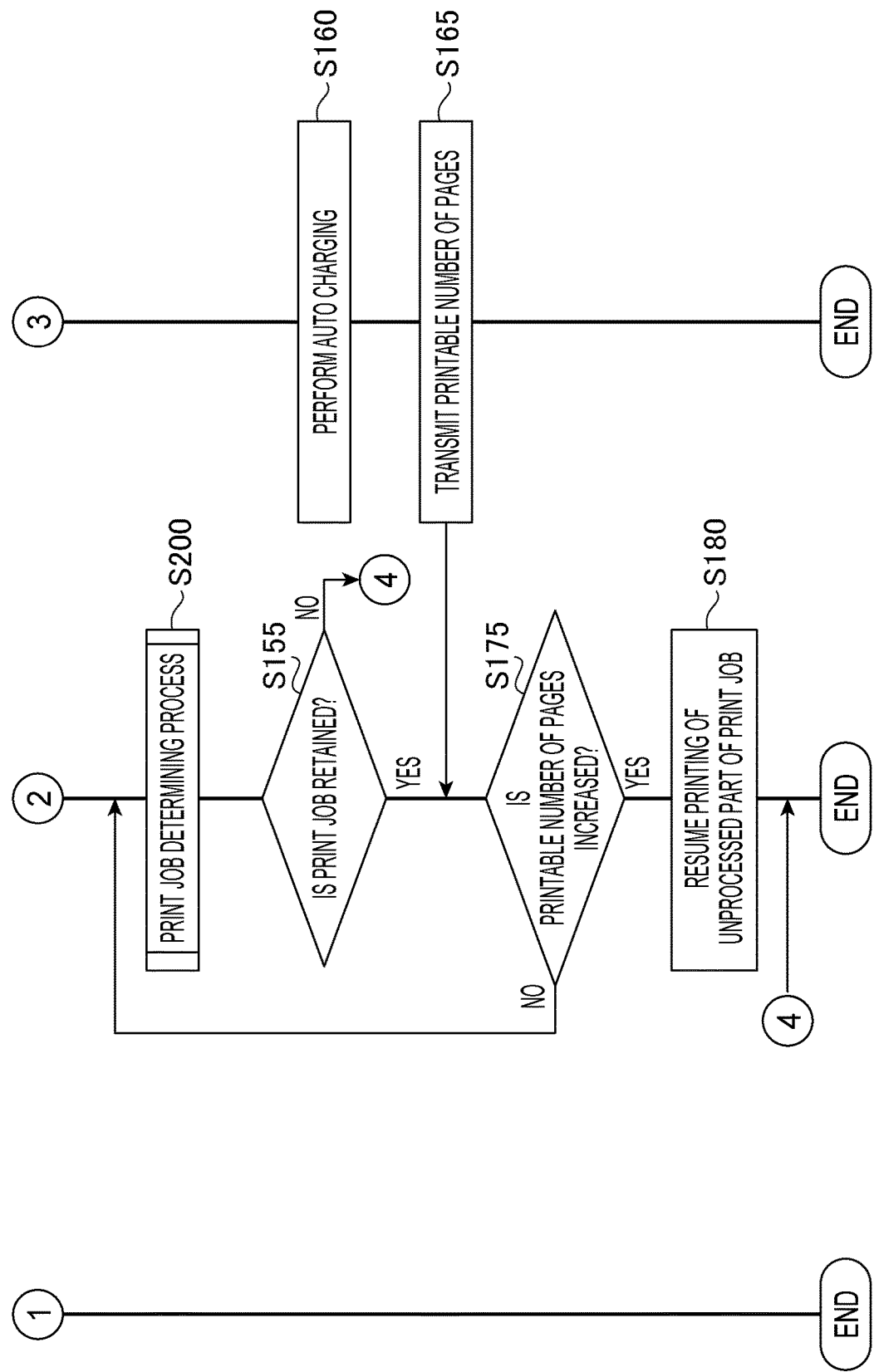

FIGS. 5A and 5B show a sequence chart when the charging mode of the MFP 200 is the auto charging mode. As shown in FIG. 5A, in S105, the CPU 310 transmits a print job to the MFP 200 in accordance with a particular operation, on the terminal device 300, by the user.

In S110, the processor 210 receives the print job transmitted from the terminal device 300. When a print instruction is to be by the user operation of the operation panel 250, the processor 210 may obtain the print job based on the operation content input by the user through the operation panel 250.

It is noted that S110 is an example of a process of obtaining a print job, and the MFP 200 executing S110 is an example of a job obtaining section according to aspects of the present disclosure.

In S115, the processor 210 executes printing for one page in accordance with the print job received in S110. The processor 210 decreases the printable number of pages by one as the printing on one page is performed.

In S120, the processor 210 determines whether run-out-of-charge of the MFP 200 is detected, that is, whether the printable number of pages is decreased to a particular number. The particular number is, typically, zero, but may be a number different from zero. For example, when the auto charging mode is set and a certain number of pages are expected to be purchased automatically by the user, the particular number could be a negative value, if it is expected that the printable number of pages will be a positive value after the number of charged pages purchased by the auto charging has been added to the printable number of pages. In the following description, a state where the printable number of pages has reached the particular number will be referred to as a "run-out-of-charge state."

It is noted that the particular number described above is an example of a first threshold, S120 is an example of a process of detecting, and the MFP 200 executing S120 is an example of a detecting section according to aspects of the present disclosure.

When the processor 210 does not detect the run-out-of-charge (S120: NO), the processor 210 proceeds to S125.

In S125, the processor 210 determines whether the printing of all the pages according to the print job has been completed. When the printing has not been completed (S125: NO), the processor 210 returns to S115. When the printing has been completed (S125: YES), the processor 210 terminates the process shown in FIGS. 5A and 5B.

When the processor 210 detects the run-out-of-charge (S120: YES), the processor 210 proceeds to S130.

In S130, the processor 210 interrupts printing based on the print job. Concretely, the processor 210 interrupts feeding of a new sheet S from the tray 201, thereby temporarily interrupting the print job such that the print job can be resumed.

The configuration to interrupt the printing in a resumable manner is assumed to be similar to a configuration employed in a conventional technology to interrupt printing when the sheets run out during printing or when the ink runs out during printing. It is noted that, in order to enable resumption of printing, a location from which the printing is to be restarted may be retained together with the print job.

In S135, the processor 210 transmits notification to notify that the MFP 200 is in the run-out-of-charge state to the management server 100. Hereinafter, the notification to notify that the MFP 200 is in the run-out-of-charge state may also be referred to as a "run-out-of-charge notification."

In S140, the processor 110 receives the run-out-of-charge notification transmitted by the MFP 200.

In S145, the processor 110 transmits a run-out-of-charge notification notifying that the MFP 200 is waiting for completion of the auto charging due to the run-out-of-charge to the terminal device 300.

In S150, the CPU 310 receives the run-out-of-charge notification transmitted in S145 by the management server 100. At this stage, the CPU 310 may display a notification indicating, for example, "Printing is temporarily stopped due to the run-out-of-charge. Please wait for a while until the auto charging is completed and the printing is resumed" based on the received run-out-of-charge notification.

After S135, the processor 210 proceeds to S200 (FIG. 5B) and performs a print job determining process. In the print job determining process, the processor 210 determines whether a status of the MFP 200 or an operation by the user satisfies a particular condition. When it is determined that the particular condition is satisfied, the processor 210 retains an unprocessed part of the print job so as to be resumed, while when it is determined that the particular condition is not satisfied, the processor 210 deletes the print job including the unprocessed part thereof.

In S155, the processor 210 determines whether the print job has been retained in the print job determining process in S200. When the print job has been deleted (S155: NO), the processor 210 terminates the process of the sequence chart shown in FIG. 4. When the print job is retained (S155: YES), the processor 210 proceeds to S175.

After S145 (FIG. 5A), the processor 110 proceeds to S160 (FIG. 5B) and performs the auto charging which is an automatic purchase of a particular number of charged pages to be added to the printable number of pages of the MFP 200.

In S165, the processor 110 transmits the number of charged pages (i.e., the number of pages to be added to the printable number of pages of the MFP 200) purchased by the auto charging to the MFP 200.

In S175, the processor 210 determines whether the printable number of pages of the MFP 200 has been increased to exceed the particular number, which is the threshold for determining whether the MFP 200 is in the run-out-of-sheets state (see S120). At a time when S175 is executed, when the printable number of pages has not been transmitted from the management server 100 in S165, and the processor 210 determines that the printable number of pages is not increased (S175: NO), the processor 210 returns to S200. At a time when S175 is executed, when the printable number of pages has been transmitted from the management server 100 in S165 and thus the MFP 200 has received the printable number of pages transmitted in S165, the processor 210 determines that the printable number of pages has been increased (S175: YES), and the processor 210 proceeds to S180.

In S180, the processor 210 resumes printing of the unprocessed part of the print job. That is, the processor 210 restarts printing to print the unprocessed part of the print job which is retained. Thereafter, the processor 210 terminates the process shown in the sequence chart of FIG. 4.

Figure 6A:
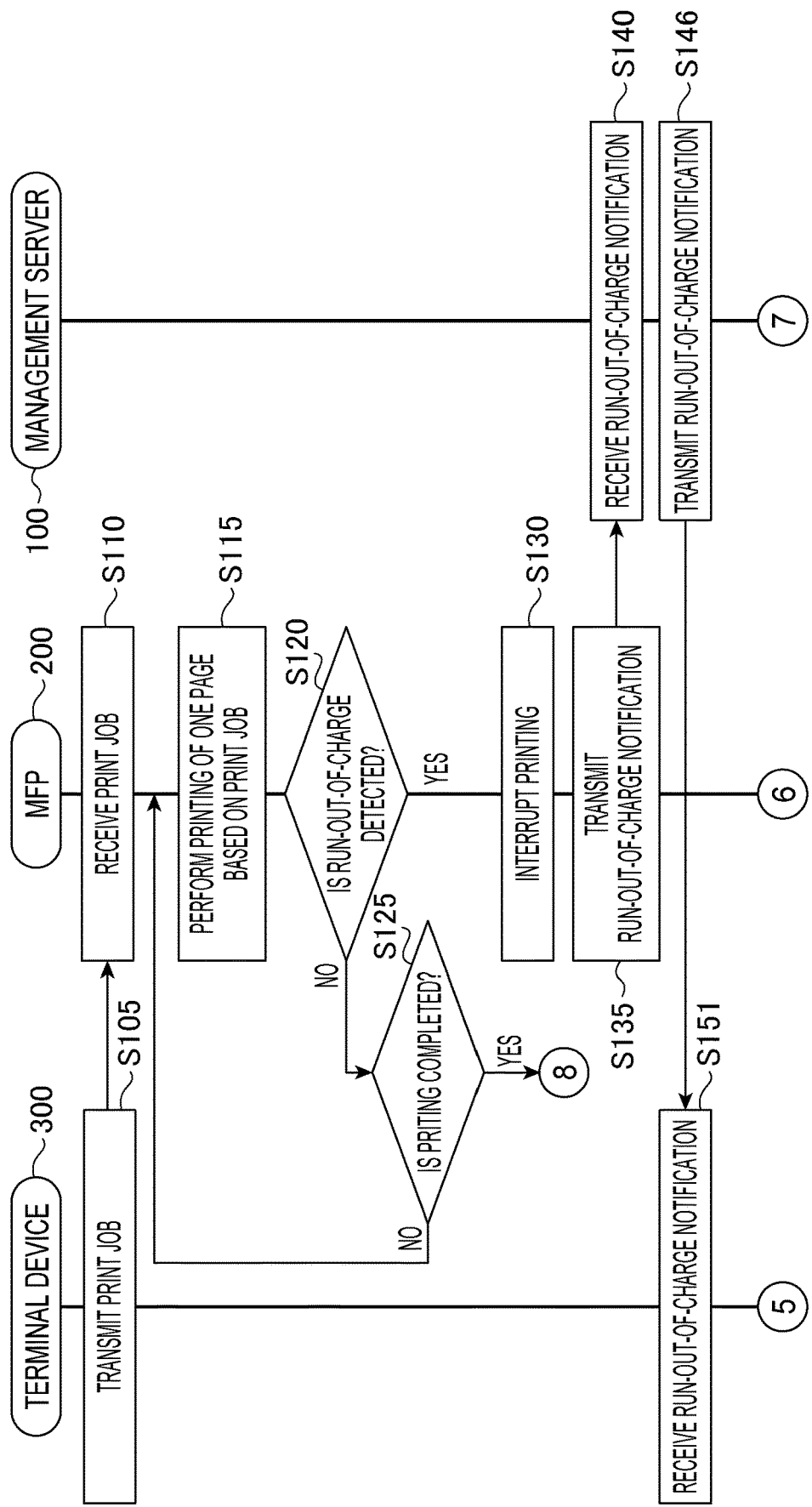
FIGS. 6A and 6B show a sequence chart showing an example of control procedures performed by the processor of the management server, the processor of the MFP and the CPU of the terminal device when run-out-of-charge has occurred when the MFP operates in the manual charging mode.
Figure 6B:
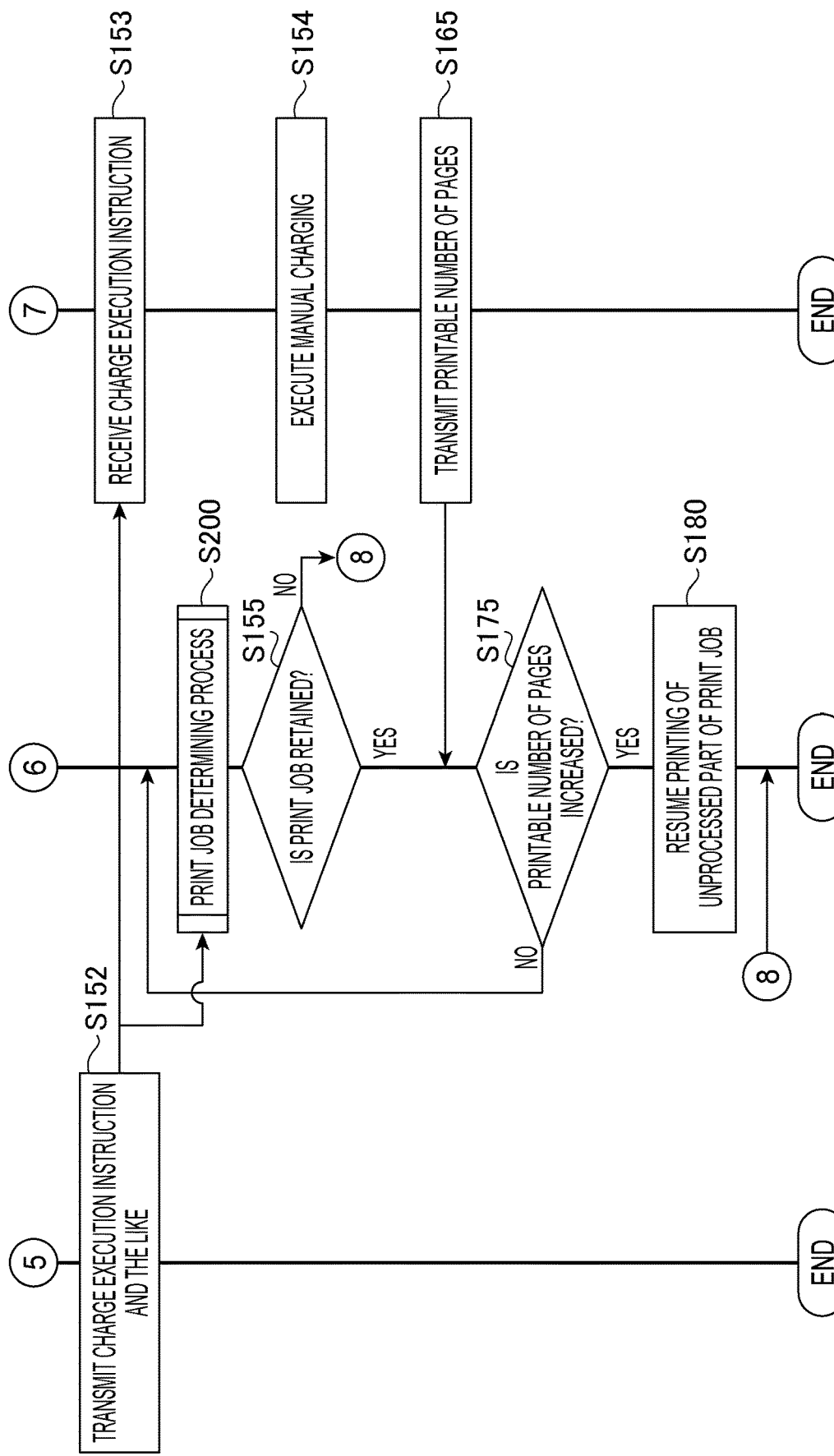

FIGS. 6A and 6B show a sequence chart when the charging mode of the MFP 200 is the manual charging mode. In FIGS. 6A and 6B, steps the same as those of FIGS. 5A and 5B are assigned with the same step numbers and description thereof will be omitted or simplified as appropriate.

S105-S140 of FIG. 6A are same as those of FIG. 5A, and the description there of will be omitted.

In S146 of FIG. 6A, the processor 110 transmits the run-out-of-charge notification notifying that the MFP 200 is in the run-out-of-charge state to the terminal device 300.

In S151, the CPU 310 receives the notification information transmitted by the management server 100. It is noted that the CPU 310 may display a notification to inform the user that the MFP 200 is in the run-out-of-charge state as appropriate based on the received run-out-of-charge notification.

After S151, the CPU 310 proceeds to S152 (FIG. 6B) and transmits operation information containing a charge execution instruction instructing to execute the manual charging to the MFP 200 and the management server 100. The operation information may include, in addition to the charge execution instruction of the manual charging, a cancellation operation of a print job, an operation to extend a waiting period which is a threshold for an elapsed time after the run-out-of-charge is detected and the like.

After S146, the processor 110 proceeds to S153 (FIG. 6B) and receives the operation information including the charge execution instruction of the manual charging transmitted, in S152, from the terminal device 300.

After S153, the processor 110 proceeds to S154 to execute the manual charging, which is a purchase of a certain number of pages to be charged in accordance with the manual operation by the user. As a result, the printable number of pages of the MFP 200 is increased by the particular number of pages.

S155, S165-S180 and S200 in FIG. 6B are the same as those in FIG. 5B and the description thereof will be omitted.

Figure 7:
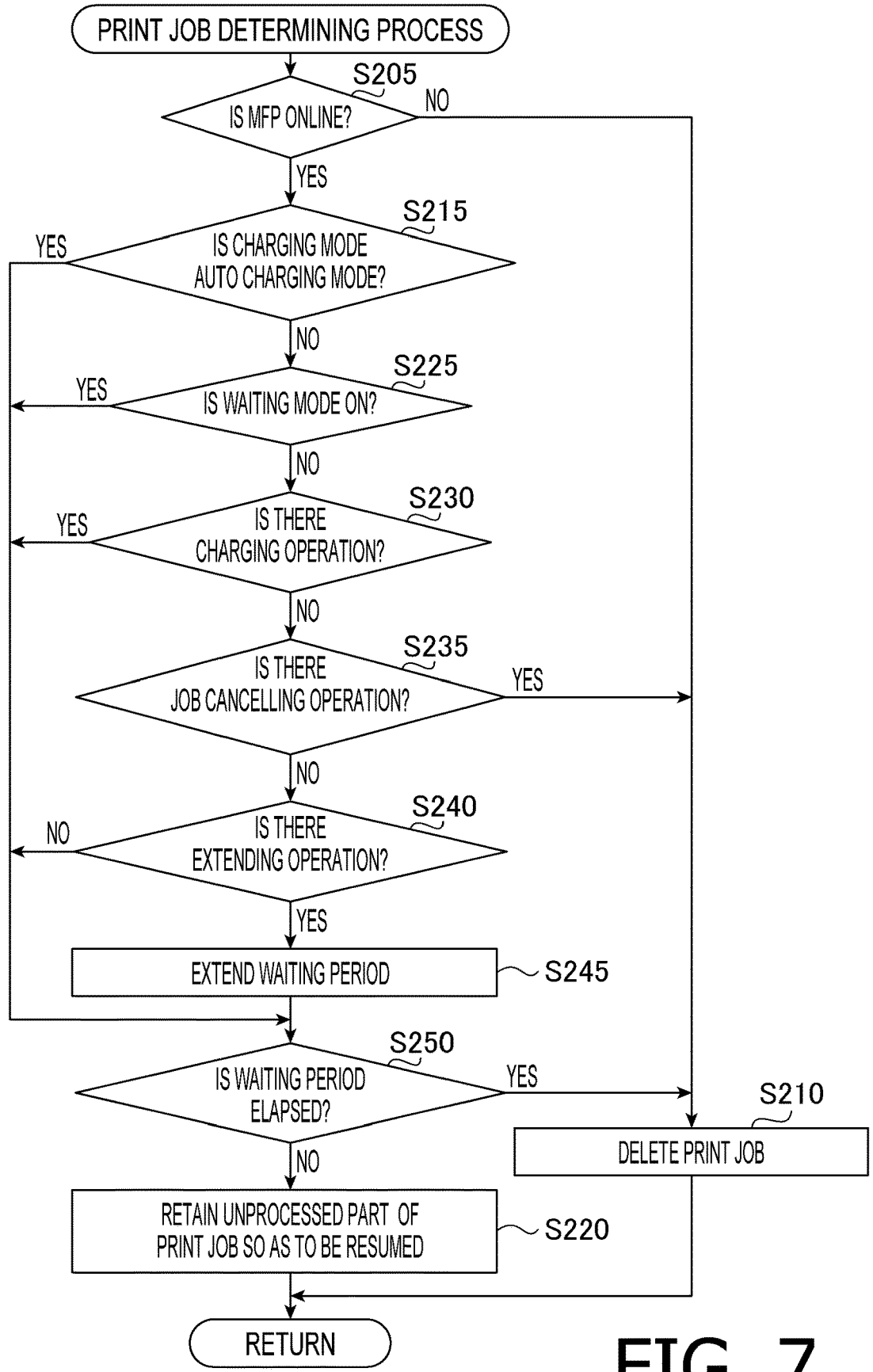
FIG. 7 is a flowchart illustrating an example of a print job determination process.

FIG. 7 is a flowchart illustrating the print job determining process performed by the processor 210 of the MFP 200 in S200 as described above.

As shown in FIG. 7, in S205, the processor 210 determines whether the MFP 200 is in an online state with respect to the management server 100. When the MFP 200 is in an offline state (S205: NO), the processor 210 determines that the particular condition is not satisfied, and proceeds to S210, at which the print job is deactivated (described later). When the MFP 200 is in the offline state, the management server 100 is unable to transmit the run-out-of-charge notification to the terminal device 300, or even if the MFP 200 operates in the auto charging mode, the management server 100 is unable to manage the MFP 200 to execute the auto charging, and the processor 210 determines that the particular condition is not satisfied. In other words, the particular condition includes a case where the MFP 200 is in the online state with respect to the management server 100.

In S210, the processor 210 deactivates the unprocessed part of the print job obtained in S110. It is noted that an expression such as "deactivation of a print job" in this specification intended to mean that resumption of printing based on the print job is disabled. In the present embodiment, as an example of the deactivation, the processor 210 deletes the print job including the unprocessed part thereof. Thereafter, the process proceeds to S155 of FIG. 5B or FIG. 6B.

On the other hand, when the MFP 200 is determined to be in the online state (S205: YES), the processor 210 proceeds to S215.

In S215, the processor 210 determines whether the charging mode of the MFP 200 is the auto charging mode. When it is determined that the charging mode is the auto charging mode (S215: YES), the processor 210 determines that the particular condition is satisfied since it is expected that the printable number of pages is increased, and proceeds to S250. Thus, the particular condition includes a condition where the printable number of pages of the MFP 200 is expected to be increased and become larger than the particular value (i.e., the run-out-of-charge would not be detected in S120), which condition includes, as an example, a case where the charging mode of the MFP 200 is the auto charging mode.

In S250, the processor 210 determines whether an elapsed period since the run-out-of-charge was detected in S120 exceeds the waiting period, which is the particular threshold period. When the elapsed period has not exceeded the waiting period (S250: NO), the processor 210 proceeds to S220. When the elapsed period has exceeded the waiting period (S250: YES), the processor 210 determines that the particular condition is not satisfied, and moves to S210. That is, the particular condition includes the elapsed period since the run-out-of-charge was detected in S120 is within the particular waiting period.

It is noted that the waiting period is an example of a second threshold according to aspects of the present disclosure.

In S220, the processor 210 retains the unprocessed part of the print job obtained in S110 so that the printing can be resumed. Concretely, the processor 210 may provide a determination flag to the print job so that the processor 210 can determine to which page the printing has been carried out, and retain the print job by temporarily storing the same in the volatile storage device 220 or the non-volatile storage device 230. Thereafter, the processor proceeds to S155 of FIG. 5A or FIG. 6A.

When it is determined that the charging mode of the MFP 200 is the manual charging mode (S215: NO), the processor 210 proceeds to S225.

In S225, the processor 210 determines whether the waiting mode is set to ON. When the waiting mode is set to ON, deactivation of the unprocessed part of the print job is inhibited, while when the waiting mode is set to OFF, the deactivation of the unprocessed part of the print job is allowed. The user is allowed to set the waiting mode to ON or OFF in advance. When the waiting mode is ON (S225: YES), the processor 210 determines that the particular condition is satisfied since inhibition of deactivation of the unprocessed part of the print job is selected, and proceeds to S250. When the waiting mode is OFF (S225: NO), the processor 210 proceeds to S230. Thus, the particular condition includes a fact that the user has selected the inhibition of deactivation of the unprocessed part of the print job.

In S230, the processor 210 determines whether the execution instruction operation of the manual charging, that is, the purchasing operation to purchase the number of pages to be charged is performed, based on the operation information transmitted from the terminal device 300 in S152. When it is determined that the execution instruction operation for the manual charging is performed by the user (S230: YES), the processor 210 determines that the particular condition is satisfied as the printable number of pages is expected to be increased, and proceeds to S250. When it is determined that the execution instruction operation for the manual charging is not performed (S230: NO), the processor proceeds to S235. Thus, the particular condition includes a fact that the printable number of pages of the MFP 200 is expected to be increased and become greater than the particular value in S120, and includes, as an example, the fact that the execution instruction operation for the manual charging has been performed.

In S235, the processor 210 determines whether a cancelling operation of the print job by the user has been performed based on the operation information transmitted from the terminal device 300 in S152. When it is determined that the cancelling operation has been performed (S235: YES), the processor 210 determines that the particular condition is not satisfied, and proceeds to S210. When it is determined that the cancelling operation of the print job has not been performed (S235: NO), the processor 210 proceeds to S240. That is, the particular condition includes a fact that cancelling operation of the print job by the user has not been performed.

In S240, the processor 210 determines whether an extending operation for the waiting period by the user has been performed based on the operation information transmitted from the terminal device 300 in S152. The waiting period is the threshold value of the elapsed period since the run-out-of-charge was detected in S120, and is set to a particular period (e.g., for five minutes). When the extending operation for the waiting period has not been performed (S240: NO), the processor 210 proceeds to S250. When the extending operation for the waiting period has been performed (S240: YES), the processor 210 proceeds to S245. It is noted that the extending operation for the waiting period performed by the user is an example of a particular operation according to aspects of the present disclosure.

It is noted that the extending operation is not necessarily a dedicated operation to extend the waiting period, but may be an operation other than the execution instruction operation for the manual charging or the cancelling operation for the print job. When such an operation other than the execution instruction operation for the manual charging or the cancelling operation for the print job is performed in the terminal device 300, it may be determined that the extending operation is performed (S240: YES) since the user's intention to increase the printable number of pages is considered to have been expressed.

In such a case, the operation other than the execution instruction operation for the manual charging or the cancelling operation for the print job is an example of the particular operation according to aspects of the present disclosure.

In S245, the processor 210 extends the waiting period by increasing the same in accordance with the extending operation for the waiting period by the user.

It is noted that S245 is an example of a process of extending the waiting period according to aspects of the present disclosure.

It is sufficient that any one of the above steps S205, S215, S225, S230, S235 and S250 may be provided, and one or more of them may be omitted. Therefore, one or more of the above steps S205, S215, S225, S230, S235 and S250 are examples of the first determination process according to aspects of the present disclosure. Further, the MFP 200 that performs one or more of the above steps S205, S215, S225, S230, S235 and S250 is an example of a determination part according to aspects of the present disclosure. The steps S130, S210 and S220 are examples of a job stopping process according to aspects of the present disclosure. The MFP 200 that executes step S130, S210 and S220 is an example of a job stopping part according to aspects of the present disclosure.

Effects of Embodiment

According to the MFP 200 described above, even though the printable number of pages has decreased and reached a particular value, if the particular condition is satisfied, the print job is interrupted with the unprocessed part of the print job retained for resumption of printing in S130 and S220. In this way, the print job can be completed to the end by resuming the printing of the unprocessed part of the print job afterwards, which improves user convenience.

According to the present embodiment, the printable number of pages of the MFP 200 must be increased to exceed at least a particular value before printing is performed. According to the present embodiment, by including, in the particular condition, that the printable number of pages is expected to become larger than the particular value, the print job is made easier to be executed.

According to the present embodiment, the printable number of pages of the MFP 200 cannot be increased by the communication from the management server 100 if the MFP 200 is not in an online state at least with the management server 100. According to the present embodiment, by including the fact that the MFP 200 is at least in an online state in the particular condition, it is easier to execute a print job based on an increase in the printable number of pages.

In the present embodiment, a certain range of the elapsed period from the detection of the run-out-of-charge state in step S120 is included in the particular condition, thereby avoiding wasting of time by keeping the waiting state indefinitely.

In the present embodiment, when the user increases the printable number of pages by the manual operation, the user's operation may take a relatively long time. In that case, if the user performs an extending operation or some other operation on the terminal device 300, it is likely that the user is trying to increase the printable number of pages by the manual operation. According to the present embodiment, when the two conditions are met, i.e., the MFP 200 is in the manual charging mode and the above-described user operation is performed, it is regarded that the user has expressed an intention to increase the printable number of pages, and the waiting period is extended in S245. In this way, a maximum time interval before the print job is deleted without retaining the same can be extended, in situations where the user is supposed to desire to retain the print job so that printing can be resumed.

According to the present embodiment, when the user performs the cancelling operation, the print job is deleted, but not retained. Thus, according to the present embodiment, processes reflecting the user's intension can be performed.

According to the present embodiment, when the particular condition is satisfied when the print job is interrupted, printing of the unprocessed part of the print job can be resumed. According to the present embodiment, it is possible to prompt the user to satisfy the particular condition when the print job is being interrupted.

According to the present embodiment, the auto charging can be realized, that is, when the printable number of pages becomes low, the printable number of pages can be increased automatically. According to the present embodiment, the convenience for the user can be improved.

According to the present embodiment, by merely interrupting feeding a new sheet S from the tray 201, interruption of the print job is realized. Further, according to the present embodiment, by restarting feeding of a new sheet S from the tray 201, the print job is restarted.

It is noted that a configuration of interrupting the printing when feeding of a new sheet S is interrupted such that the printing can be resumed is well-known, and by employing such a configuration in the present embodiment, controlling of resumption of the printing can be performed easily.

According to the present embodiment, when the particular condition is not satisfied, the print job can be deleted. Thus, according to the present embodiment, when the printable number of pages is unlikely to be increased, or when the user does not wish to retain the print job, the process of deleting the print job can be performed as in a conventional manner.

According to the present embodiment, the particular condition includes the user's selection of inhibition of deactivation of the unprocessed part of the print job. Thus, according to the present embodiment, it is more convenient for a user who definitely wishes to execute a print job at any cost since it is ensured, by inhibiting the deactivation, that the unprocessed part of the print job is retained so as to be resumed.

According to the present embodiment, it is possible to delete the mode information representing the auto charging mode stored in the data storage area 232 based on the mode information representing the manual charging mode transmitted from the management server 100. Thus, according to the present embodiment, when the MFP 200 is sold to someone else, it is possible to suppress the number of pages to be charged being purchased automatically by error due to the mode information being left in the data storage area 232.

Modifications

The present disclosure is not necessarily limited to the above-described embodiment, but can be modified in various ways without departing from aspects of the present disclosure. Modifications in accordance with aspects of the present disclosure will be described hereinafter.

(1) Configuration to Set MFP to Stand-by after Conveying Sheet to Particular Position When it is determined that the particular condition is satisfied, the processor 210 may cause the MFP 200 to stand by after causing the conveyance mechanism 260 to convey one sheet S fed from the tray 201 to a particular position.

FIG. 8 schematically shows an example of the conveyance mechanism 260 and a conveyance passage of the sheet S of the MFP 200 according to a modification. As shown in FIG. 8, the MFP 200 has the tray 201, a sheet feed roller 204, the conveyance mechanism 260, the print engine 290, the discharging part 202, and a reversing flapper 203. In the tray 201, multiple sheets S are accommodated in a stacked manner. The sheet feed roller 204 is configured to pick up the uppermost sheet S of the stacked sheets S one by one and feeds the picked-up sheet toward a forward passage L1. The conveyance mechanism 260 has multiple rollers for conveying the sheet S supplied from the tray 201 along the forward passage L1. The print engine 290 performs printing by forming an image onto the sheet S conveyed along the forward passage L1. The sheet S on which the printing has been performed is further conveyed along the forward passage L1 toward the discharging part 202, and then discharged out of the discharging part 202.

The reversing flapper 203 operates when a duplex printing is performed onto the sheet S.

After conveying the sheet S in a forward direction until a trailing edge of the sheet S, on which printing on the front surface thereof has completed, passes through a position of the reversing flapper 203 located on a front side position, the conveyance mechanism 260 stops conveying the sheet S in a forward direction. Then, the reversing flapper 203 is moved to be located on a rear side position, and the conveyance mechanism 260 conveys the sheet S toward a reverse passage L2. The sheet S conveyed along the reverse passage L2 is merged into the forward passage L1. In this way, the sheet S is reversed after printing on the front surface, so that a back surface of the sheet S faces the print engine 290.

FIG. 9 is a flowchart illustrating an example of the print job determining process performed in S200 by the processor 210 of the MFP 200 according to the modification. Steps in FIG. 9 the same as those in FIG. 7 are assigned with the same step numbers and description thereof will be omitted as appropriate.

FIG. 9 is different from FIG. 7 in that S255 is performed after S220, and S253 is performed after S210 in FIG. 9. Steps S205-S250 of FIG. 9 are the same as those in FIG. 7 and description thereof will be omitted.

After S220, the processor 210 proceeds to S225. In S225, the processor 210 conveys, with the conveyance mechanism 260, one sheet S fed from the tray 201 along the forward passage L1, and makes the MFP 200 to stand by with the sheet S being located at a particular position on an upstream side with respect to a printing position of the print engine 290. The particular position is, for example, a position indicated by the sheet S1 in FIG. 8.

When a duplex printing setup is made to print on both sides of a sheet S, and the run-out-of-charge is detected in S120 when an image is recorded on one side of the sheet S by the print engine 290, the following control may be performed. The processor 210 may cause the sheet S to stop and the MFP 200 to stand by with the sheet S located at a particular position after the sheet S has been reversed by the reversing flapper 203 and the conveyance mechanism 260. The particular position is, for example, a position indicated by S1 in FIG. 8.

It is noted that the reversing flapper 203 and the conveyance mechanism 260 constitute an example of a reversing mechanism. S130, S210 and S253, and S220 and S225 are examples of the job interruption process.

In the present modification, after S210, the processor 210 proceeds to S253. In S253, if there is a sheet S waiting at the particular position or being conveyed toward the particular position at which the sheet S is supposed to be paused, the processor 210 discharges the sheet S outside the MFP 200 without performing printing on the sheet S. In this way, it is possible to prevent the sheet S from remaining in the MFP 200 if printing is not resumed since the manual charging is not performed before the waiting period has elapsed.

According to the modification, in addition to execution of the print job as the number of charged pages is added to the printable number of pages, it is possible to convey the sheet S, while the printing is interrupted, at a position close to the print position of the print engine 290 and make the sheet S to be paused at that position. Thus, according to the present modification, the image formation on the sheet S when the print job is resumed after being interrupted can be started quickly.

According to the present modification, when a print job is interrupted in the middle of printing when printing on one surface of the sheet S is finished in the duplex printing setup, the sheet S is stopped at the particular position after being reversed by the reversing mechanism in advance in preparation for printing on the other surface of the sheet S when the job is resumed. According to the present modification, the image formation on the sheet S when the print job is resumed in the duplex printing setup can be started quickly.

(2) Configuration to Suspend and Store Print Job

In the above-described embodiment, as an example of the deactivating, the print job is deleted. However, the deactivation is not necessarily limited to the deletion, but may include suspending a print job and storing the same in a particular location such that the stored print job is not resumed immediately but can be resumed when necessary (e.g., in response to a user's operation).

FIG. 10 is a flowchart illustrating an example of the print job determining process to be performed in S200 by the processor 210. In FIG. 10, steps same as those in FIG. 7 are assigned with the same step numbers and description thereof will be omitted.

The flowchart shown in FIG. 10 is different from the flowchart shown in FIG. 7 in that S210 of FIG. 7 is replaced with S211. The other steps are same as those in FIG. 7 and description thereof will be omitted.

In S211, the processor 210 stores the print job obtained in S110 in a particular storage area so as to be retrievable, but the print job cannot be resumed immediately unless a particular operation by the user is performed. For example, position information indicating the unprocessed part may not be stored together with the print job. The particular storage area may be, for example, the volatile storage device 220 or the non-volatile storage device 230 of the MFP 200, or the volatile storage device 120 or the non-volatile storage device 130 of the management server 100.

It is noted that, according to the present modification, S130, S211 and S220 are examples of a job stopping process according to aspects of the present disclosure.

According to the present modification, even if the particular condition is not satisfied, the print job is stored in the particular storage area without deleting the same, and it is possible to resume the printing of the print job later when the user performs the particular operation.

(3) Configuration to Detect Run-Out-of-Charge Before Starting Printing

In the above-described embodiment, whether the MFP 200 is in the run-out-of-charge state is determined (S120) every time the printing of one sheet is performed. However, a timing to determine whether the run-out-of-charge occurs is not necessarily limited to the above. When, for example, the print job contains the number of pages, or the number of copies to be printed, that is, when the processor 210 is capable of grasping the number of pages to be consumed for printing when the processor 210 obtains the print job, the processor 210 may determine whether the run-out-of-charge would occur before starting the printing.

FIGS. 11A and 11B show a sequence chart illustrating an example of processes performed by the processor 110 of the management server 100, the processor 210 of the MFP 200 and the CPU 310 of the terminal device 300 when the charging mode of the MFP 200 is the auto charging mode. In FIGS. 11A and 11B, steps the same as those in FIGS. 5A and 5B are assigned with the same step numbers and description thereof will be omitted as appropriate.

S105 and S110 of FIG. 11A are the same as those in FIG. 5A, and the description thereof will be omitted. After S110, the processor 210 proceeds to S121.

In S121, the processor 210 determines whether the run-out-of-charge is expected to occur based on the print job obtained in S110 and the current printable number of pages. In other words, the processor 210 determines whether the printable number of pages is expected to reach the aforementioned particular value if the print job is performed. When the run-out-of-charge is not expected to occur (S121: NO), the processor 210 proceeds to S123.

In S123, the processor 210 performs the printing based on the print job received in S110. Further, the processor 210 decreases the printable number of pages by the number of pages on which the printing has been performed.

In S125, the processor 210 determines whether printing on all the pages based on the print job has been finished. When the printing on all the pages has not been finished (S125: NO), the processor 210 returns to S123. When the printing has been completed (S125: YES), the processor terminates the process of the sequence chart shown in FIGS. 11A and 11B.

When the run-out-of-charge is expected to occur (S121: YES), the processor 210 proceeds to S131.

In S131, the processor 210 pauses without starting the printing based on the print job.

S135-S175 and S200 are the same as those in FIGS. 5A and 5B and the description thereof will be omitted.

After S175 (see FIG. 11B), the processor 210 proceeds to S181. In S181, the processor 210 starts the printing based on the print job received in S110. Then, the processes in the sequence chart shown in FIGS. 11A and 11B are terminated.

Although not shown for brevity, when the charging mode of the MFP 200 is the manual charging mode, the sequence chart shown in FIGS. 6A and 6B may be modified as described above.

It is noted that S131, S210 and S220 are example of the job interrupting process. Also in the present modification, effects as in the above-described embodiment can be obtained.

(4) Other Modifications

When the MFP 200 interrupts printing and waiting for resumption of printing, a waiting status (e.g., waiting for the execution of the auto charging, the manual charging and the like) may be displayed discriminatively so that the user can grasp the same. Although method of indicating such a status is not necessarily limited, if, for example, the MFP 200 has an LED lamp, the LED lamp may be blinked when the MFP 200 is waiting for the execution of the auto charging. In such a case, in FIGS. 5A and 5B above, the LED lamp may blink from the time when the printing is interrupted in S130 until the increased printable number of pages is received in S175. Further, when the MFP 200 is waiting for the execution of the manual charging, the LED lamp may be lit continuously. In such a case, in FIGS. 6A and 6B above, after printing is stopped in step S130, the LED lamp may be lit continuously until the determination in step S230 becomes positive in FIG. 7. It is noted that the above indication is not necessarily limited to the indication using the LED lamp, but the indication may be displayed, for example, on the display 240 of the MFP 200, or a touch panel 340 of the terminal device. According to this modification, when the LED lamp is blinking, the user is informed that he/she should just wait, and when the LED lamp is lit continuously, the user is encouraged to perform the manual charging.

Further, in the above, when the MFP 200 is offline with respect to the management server 100, the unprocessed part of the print job is unconditionally deleted, but the configuration is not limited to this. For example, when the MFP 200 is offline with respect to the management server 100, if the waiting mode is set to ON, the unprocessed part of the print job may be retained. As mentioned above, when the waiting mode is set to ON, the deactivation of the unprocessed part of the print job is inhibited, while when the waiting mode is set to OFF, the deactivation of the unprocessed part of the print job is allowed, and the user is allowed to select and set either ON or OFF state of the waiting mode in advance.

At least part of the processing by the processor 210 of the MFP 200 as described above may be performed by the processor 110 of the management server 100 or the CPU 310 of the terminal device 300. For example, S110, which is an example of a job obtaining process, may be performed by the processor 110 of the management server 100 or the CPU 310 of the terminal device 300. In such a case, the management server 100 or the terminal device 300 is an example of the obtaining part. Further, S120, which is an example of the detecting process, may be performed by the processor 110 of the management server 100 or the CPU 310 of the terminal device 300. In such a case, the management server 100 or the terminal device 300 is an example of a detection part according to aspects of the present disclosure. One or more of steps S205, S215, S225, S230, S235, and S250, which are examples of the first determination process, may be performed by the processor 110 of the management server 100 or the CPU 310 of the terminal device 300. In such a case, the management server 100 or the terminal device 300 may be an example of a determining part according to aspects of the present disclosure. Further, steps S130, S210 and S220, which are examples of the job stopping process, may be executed by the processor 110 of the management server 100 or the CPU 310 of the terminal device 300. In such a case, the management server 100 or the terminal device 300 may be an example of a stopping part according to aspects of the present disclosure.

The above description is based on the case where the printing device is the MFP 200, but is not necessarily limited to the MFP 200. In addition to MFPs, the printing device according to aspects of the present disclosure may be, for example, a printer or a copier.

In the above description, when the external dimensions or sizes are described as "identical," "equal," "different," and the like, such descriptions are not meant to be strictly accurate. In other words, those "identical," "equal," and "different" mean "substantially identical," "substantially equal," and "substantially different," with tolerances and errors allowed in design and manufacturing.

However, when there is a description of a particular value that serves as a particular determination criterion or delimiter, such as a threshold value (see the flowcharts in FIGS. 5A and 5B, FIGS. 6A and 6B, FIG. 7, FIG. 9, FIG. 10, FIGS. 11A and 11B) or a reference value, "same," "equal," "different" and the like regarding them are meant in strict accordance.

The flowcharts/sequence charts shown in FIG. 4 through FIG. 7 and FIG. 9 through FIG. 11 are not necessarily meant to limit procedures to those shown therein, but procedures may be added, deleted, or changed in sequence to the extent that they do not depart from the purpose and technical concept according to aspects of the present disclosure.

In addition to what has already been described above, methods and processes according to the above embodiment and respective modifications may also be used in combination as appropriate.

Further, although examples are not given, the present disclosure may be implemented with various modifications within, not departing from, aspects of the present disclosure.

What is claimed is:

1. A printing device, comprising:
   a print engine; and
   a controller including hardware,
   the print engine being configured to perform printing until an allowed printing amount reaches a first threshold value, the allowed printing amount being decreased from an initial value as printing proceeds, the allowed printing amount being increased in accordance with a particular guaranteed printing amount guaranteed by a printing privilege given to a user by a financial burden borne by the user, and
   the controller being configured to:
   obtain a print job;
   perform printing in accordance with the print job;
   detect that the allowed printing amount reaches the first threshold value;

interrupt the print job in response to determining that the allowed printing amount reaches the first threshold value;

determine whether a particular condition is satisfied in response to the allowed printing amount reaching the first threshold value;

in response to determining that the particular condition is not satisfied, deactivate an unprocessed part of the print job; and in response to determining that the particular condition is satisfied, retaining the unprocessed part of the print job is resumable.

2. The printing device according to claim 1, wherein the particular condition includes that the allowed printing amount is expected to exceed the first threshold value.

3. The printing device according to claim 1, wherein the particular condition includes that the printing device is in an online state with respect to an information management device configured to manage the printing privilege.

4. The printing device according to claim 1, wherein the particular condition includes that an elapsed period after the controller detects that the allowed printing amount reaches the first threshold value is within a second threshold value.

5. The printing device according to claim 4, wherein the controller is further configured to increase the second threshold value in response to a user performing a particular operation on a terminal device connected to the printing device when a charging mode of the printing device is a first mode in which a first guaranteed printable amount corresponding to a first printing privilege based on a purchasing request made by a manual operation by the user is to be added to the allowed printing amount.

6. The printing device according to claim 1, wherein the particular condition includes that a user operation to cancel the print job is not performed.

7. The printing device according to claim 1, wherein the controller is further configured to perform printing of the unprocessed part of the print job in response to the allowed printing amount exceeding the first threshold value after stopping printing so that the unprocessed part of print job is resumable.

8. The printing device according to claim 1, wherein the particular condition includes that a charging mode of the printing device is a second mode in which a second guaranteed printing amount corresponding to a second printing privilege automatically purchased without being based on a purchase request made by a manual operation by the user is to be added to the allowed printing amount.

9. The printing device according to claim 1, further comprising:
a tray configured to accommodate multiple recording mediums; and
a conveyance mechanism configured to convey a recording medium fed from the tray,
wherein the print engine is disposed on a conveyance passage for the multiple recording mediums to form an image in accordance with the print job on each of the multiple recording mediums sequentially fed from the tray, and
wherein the controller is configured to, in response to detecting that the allowed printing amount reaches the first threshold value, interrupt feeding of a recording medium from the tray.

10. The printing device according to claim 1, further comprising:
a tray configured to accommodate multiple recording mediums; and
a conveyance mechanism configured to convey a recording medium fed from the tray,
wherein the print engine is disposed on a conveyance passage for the multiple recording mediums to form an image corresponding to the print job on each of the multiple recording mediums sequentially conveyed from the tray, and
wherein the controller is configured to:
in response to determining that the particular condition is satisfied, control the conveyance mechanism to convey one recording medium fed from the tray along the conveyance passage, stop the one recording medium at a particular position on an upstream side with respect to a printing position of the print engine; and
hold the one recording medium at the particular position.

11. The printing device according to claim 1, further comprising a reversing mechanism configured to reverse front and back surfaces of a recording medium,
wherein, when a duplex print setup to print both surfaces of a recording medium is set, the controller is configured to:
in response to detecting that the allowed printing amount reaches the first threshold value when the print engine performs printing on a surface of a recording medium, stop the recording medium at a particular position after the recording medium is reversed by the reversing mechanism; and
hold the recording medium at the particular position.

12. The printing device according to claim 1, wherein the controller is configured to deactivate the unprocessed part of the print job by deleting the print job.

13. The printing device according to claim 1, wherein the controller is configured to deactivate the unprocessed part of the print job by storing the print job in a particular storage area and end the print job.

14. The printing device according to claim 1, wherein the particular condition includes that inhibition of the deactivation of the unprocessed part of the print job is selected by the user.

15. The printing device according to claim 8, further comprising a storage,
wherein the controller is further configured to:
obtain mode information representing whether the charging mode of the printing device is the second mode or not;
store the obtained mode information in the storage; and
delete the mode information stored in the storage in response to receiving a reset signal.

16. A print management system, comprising:
a terminal device;
a printing device configured to print an image on a sheet; and
an information management device including:
a communication interface configured to communicate with each of the printing device and the terminal device via a network; and a controller configured to manage the printing device, the printing device being configured to perform printing until an allowed printing amount reaches a first threshold value, the allowed printing amount being decreased from an initial value as printing proceeds, the allowed printing amount being increased in accordance with a particular guaranteed printing amount guaranteed by a printing privilege given to a user by a financial burden borne by the user, the print management system is configured such that one of the terminal device, the printing device and the information management device is configured to:

obtain a print job;

detect that the allowed printing amount is decreased to the first threshold value;

interrupt the print job in response to determining that the allowed printing amount reaches the first threshold value;

determine whether a particular condition is satisfied in response to determining that the allowed printing amount reaches the first threshold value;

in response to determining that the particular condition is not satisfied, deactivate an unprocessed part of the print job obtained in the obtaining; and in response to determining that the particular condition is satisfied, retain the unprocessed part of the print job obtained in the obtaining so as to be resumable.

17. The printing device according to claim 1, wherein the particular condition is related to printing by the print engine.

\* \* \* \* \*